United States Patent [19]

Asada et al.

[11] Patent Number: 4,794,209
[45] Date of Patent: Dec. 27, 1988

[54] POSITION COORDINATE DETERMINING APPARATUS

[75] Inventors: Akihiro Asada, Chigasaki; Hideaki Idei, Oyama, both of Japan

[73] Assignee: Hitachi, Ltd., Tokyo, Japan

[21] Appl. No.: 55,134

[22] Filed: May 28, 1987

[30] Foreign Application Priority Data

May 28, 1986 [JP] Japan .................................. 61-121051
Nov. 28, 1986 [JP] Japan .................................. 61-281711

[51] Int. Cl.⁴ .............................................. G08C 21/00
[52] U.S. Cl. ...................................................... 178/19
[58] Field of Search ............................... 178/18, 19, 20; 340/347 AD

[56] References Cited

U.S. PATENT DOCUMENTS 4,029,899 6/1977 Gordon .................................. 178/19

FOREIGN PATENT DOCUMENTS 53-34855 9/1978 Japan .
57-31188 7/1982 Japan .

Primary Examiner—Stafford D. Schreyer
Attorney, Agent, or Firm—Antonelli, Terry & Wands

[57] ABSTRACT

An apparatus suitable for measuring coordinate positions of points in a wide range of coordinate read area on a plane. The apparatus includes a cursor, a cursor drive circuit for supplying an alternate current signal to the cursor, a coordinate read device for detecting an induced magnetic field generated by a current flowing through the cursor and for generating a plurality of induced voltages, a change-over circuit connected to the coordinate read device, an induced voltage detect circuit connected to the change-over circuit for detecting a peak voltage of the plurality of induced voltages generated by the coordinate read device, a coordinate position detect circuit for effecting a calculation of a position of the cursor from the plurality of the peak voltages detected, and a control circuit for controlling the cursor drive circuit, the change-over circuit, the induced voltage detect circuit, and the coordinate detect circuit. The coordinate detect circuit has at least two grid structures including a grid structure for detecting a small region where the cursor exists and a grid structure for detecting a large region where the cursor exists. The former is provided with four fine position sense lines, whereas the latter has a plurality of coarse position sense lines. The position of the cursor is calculated from a plurality of induced voltages appearing in the plurality of fine position sense lines and a plurality of induced voltages developed in the plurality of coarse position sense lines.

20 Claims, 36 Drawing Sheets

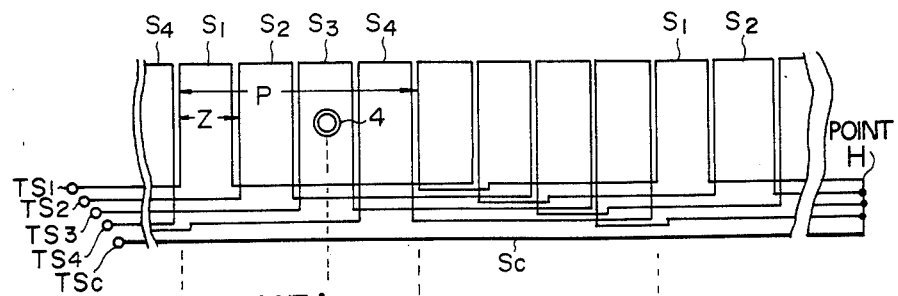
FIG. 5A
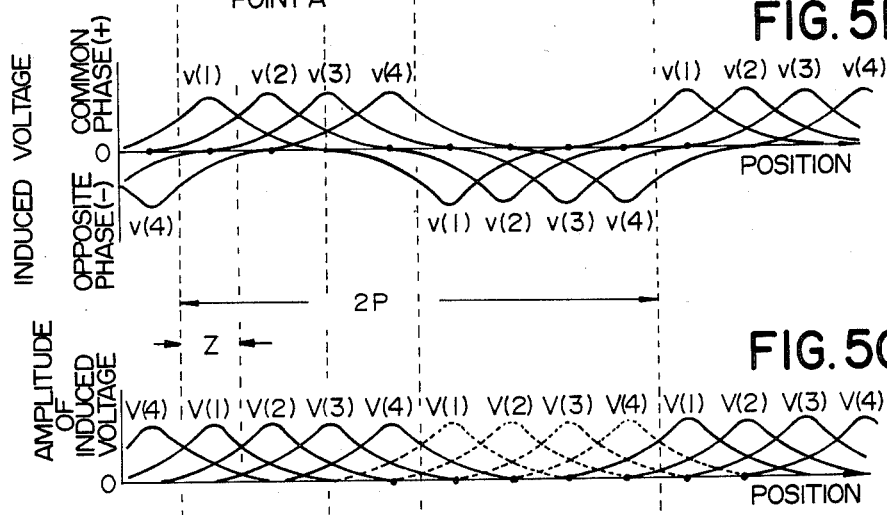
FIG. 5B
FIG. 5C
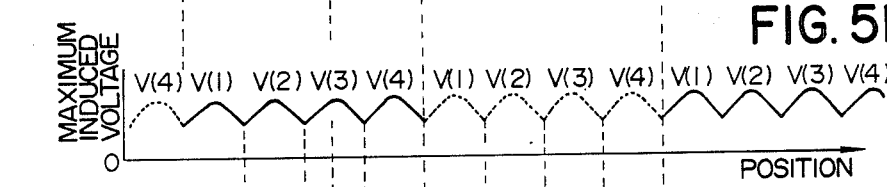
FIG. 5D
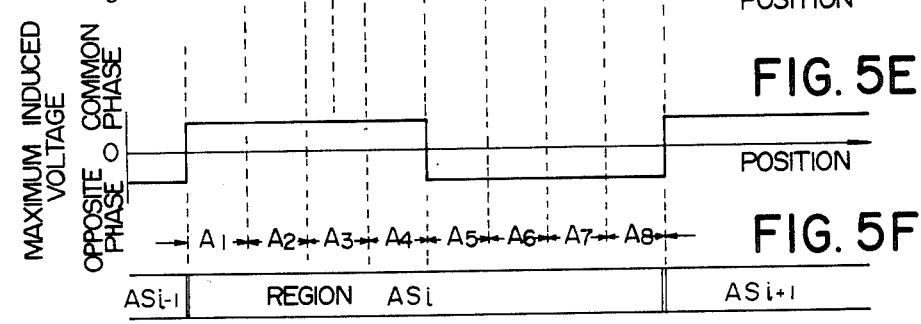
FIG. 5E
FIG. 5F

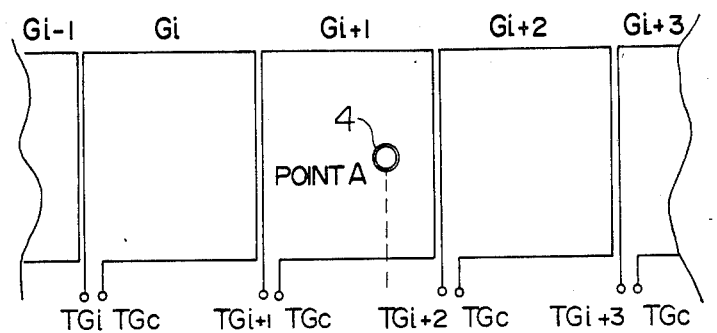
FIG. 7A
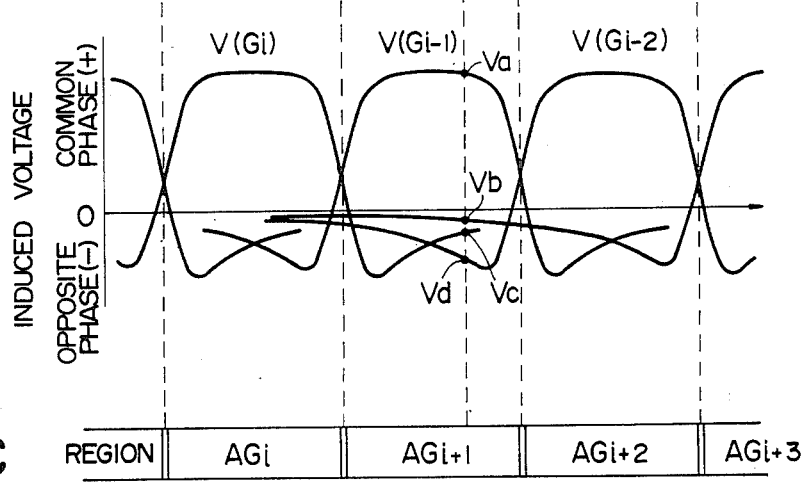
FIG. 7B
FIG. 7C

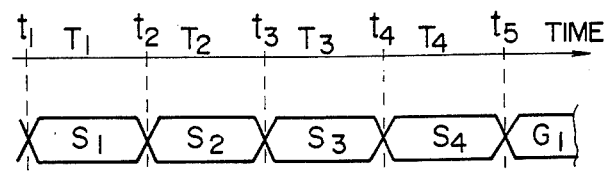
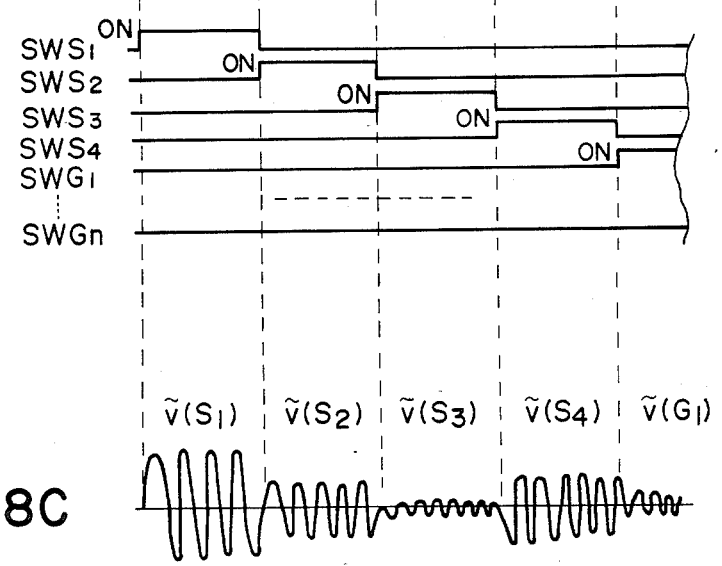

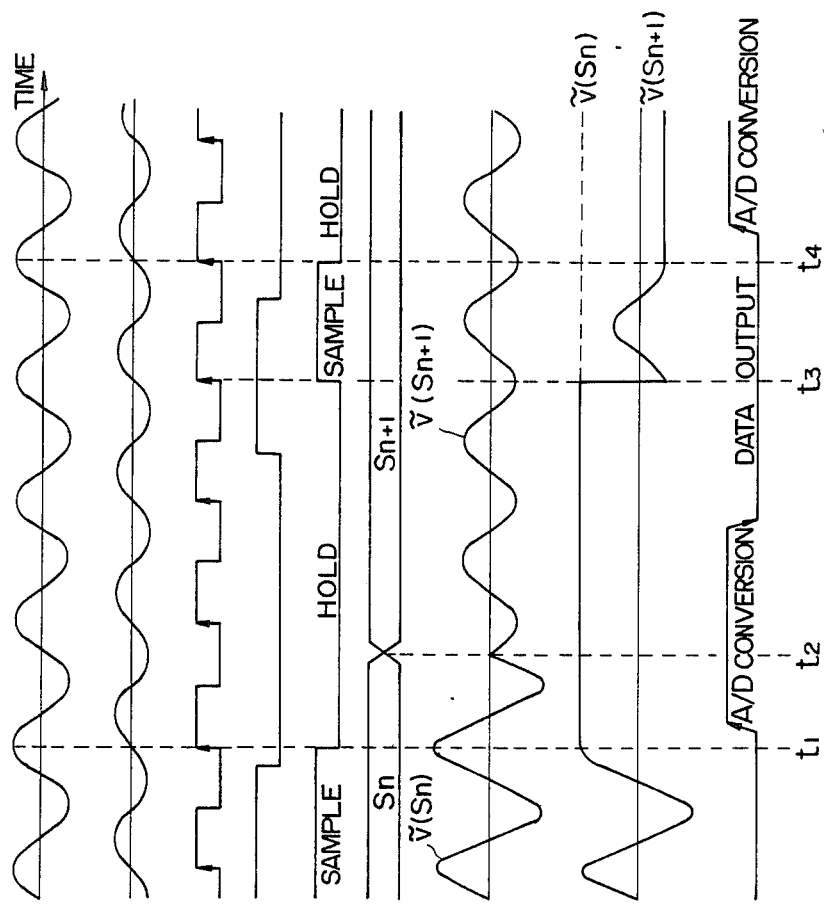

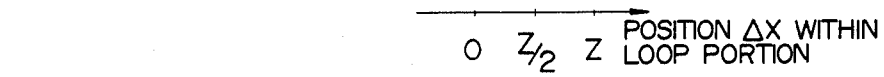

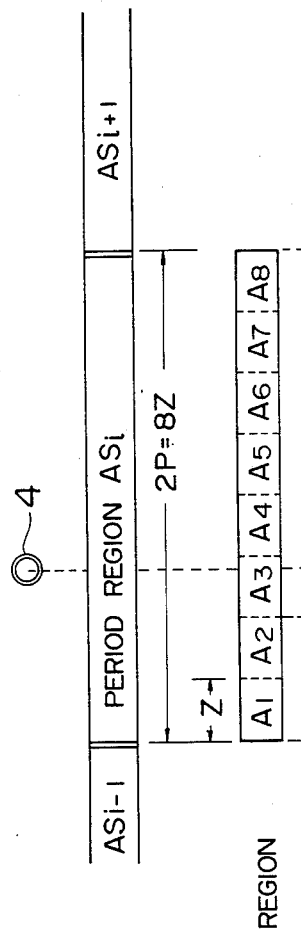
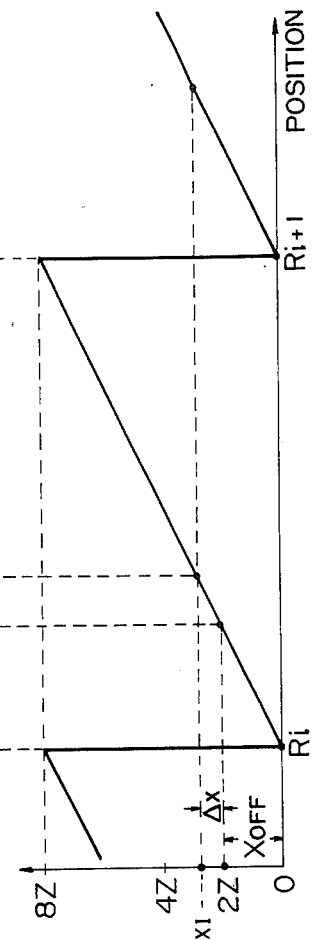
FIG. 12A REGION
FIG. 12B SMALL REGION
FIG. 12C POSITION IN REGION

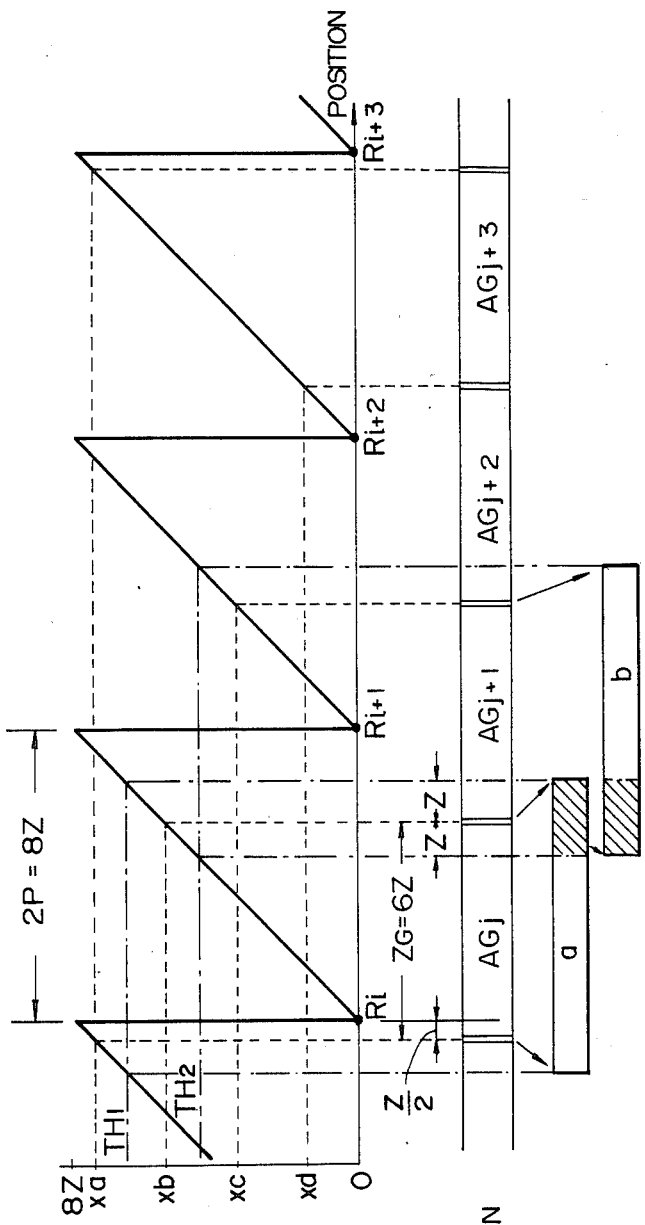

POSITION COORDINATE DETERMINING APPARATUS

BACKGROUND OF THE INVENTION

The present invention relates to an apparatus for detecting the coordinate positions of points on a plane, and in particular, to an apparatus comprising a movable cursor and a coordinate read device having an array of position-measuring conductors disposed on a plane for detecting by the conductors the alternate-current (AC) magnetic field generated by the cursor, thereby determining the position of the cursor.

Apparatuses for measuring a coordinate position have been described in the JP-B-57-31188, JP-B-53-34855, U.S. Pat. Nos. 3,735,044, and 3,647,963.

The JP-B-57-31188 and JP-B-53-34855 disclose apparatuses which require many position measuring conductors when the range of the coordinates to be read is great. The apparatuses of the U.S. Pat. Nos. 3,735,044 and 3,647,963 are suitable for an apparatus of which the coordinate read range is small, namely, these inventions are not suitably applicable to an apparatus having a large coordinate range to be read.

SUMMARY OF THE INVENTION

It is therefore an object of the present invention to provide an apparatus for appropriately measuring a coordinate position in a large coordinate read range, particularly, an apparatus for correctly determining a coordinate position with a small number of position-measuring conductors.

According to the present invention, there is provided a coordinate position measuring apparatus including a cursor, a cursor drive circuit for supplying an AC signal to the cursor, a coordinate read device for detecting an induced magnetic field generated by the current flowing through the cursor and for generating a plurality of induced voltages, a change-over circuit connected to the coordinate read device, an induced voltage detect circuit connected to the change-over circuit for detecting a peak voltage of each of the induced voltages generated by the coordinate read device, a coordinate position detect circuit for computing the peak voltage detected and for calculating a position of the cursor, and a control circuit for controlling the cursor drive circuit, the change-over circuit, the induced voltage detect circuit, and the coordinate position detect circuit.

The coordinate read device has at least two grid structures of which a first grid structure detects a small region where the cursor exists and a second grid structure detects a large region where the cursor exists.

The first grid structure comprises a plurality of fine position sense lines, and the number thereof is desirably four; whereas the second grid structure includes a plurality of coarse position sense lines.

Each of the fine position sense lines of the first grid structure has a plurality of small loop sections each being disposed at a distant of P from each other and having a width of l, and the currents flowing through adjacent small loop sections have the opposite directions. Namely, the currents flowing through two small loop section having a distance of $2 \times P$ therebetween have the identical direction. The fine position sense lines are located with an interval of Z therebetween.

Each of the coarse position sense lines of the second grid structure forms a large loop having a width less than the distance of $2 \times P$.

In the apparatus of the present invention, an approximate position of the cursor in the coordinate read device can be detected in the width of the large loop by use of the induced voltages caused to exist in a plurality of large loops due to a plurality of coarse position sense lines of the second grid structure. By measuring the induced voltages formed in the small loops due to a plurality of fine position sense lines of the first grid structure, an approximate position of the cursor in the coordinate read device can be sensed in the width l. Since each fine position sense line has a loop, a plurality of cursor positions are sensed by a plurality of fine position sense lines. From the cursor positions sensed by means of the first and second grid structures, a small loop in which the cursor exists is determined. The correct position of the cursor in the small loop is calculated by executing computations on the induced voltages generated in the fine position sense lines.

BRIEF DESCRIPTION OF THE DRAWINGS

The present invention will be apparent from the following detailed description taken in conjunction width the accompanying drawings in which:

FIGS. 5A–5F are graphs depicting waveforms of the peak values of induced voltages appearing in the fine position sense lines;

FIGS. 7A–7C are schematic diagrams illustrating a function of the course position sense lines of a grid structure a large region;

FIGS. 8A–8C are schematic diagrams depicting a function of a change-over circuit;

FIGS. 10A–10I are graphs illustrating waveforms of signals at respective positions of the induced voltage detect circuit;

FIGS. 12A–13D are schematic diagrams useful for explaining functions of the fine position detect circuit;

FIGS. 17A–18E are graphs showing waveforms of peak values of voltages appearing in the fine position sense lines of the second embodiment;

DESCRIPTION OF THE PREFERRED EMBODIMENTS

Figure 1:
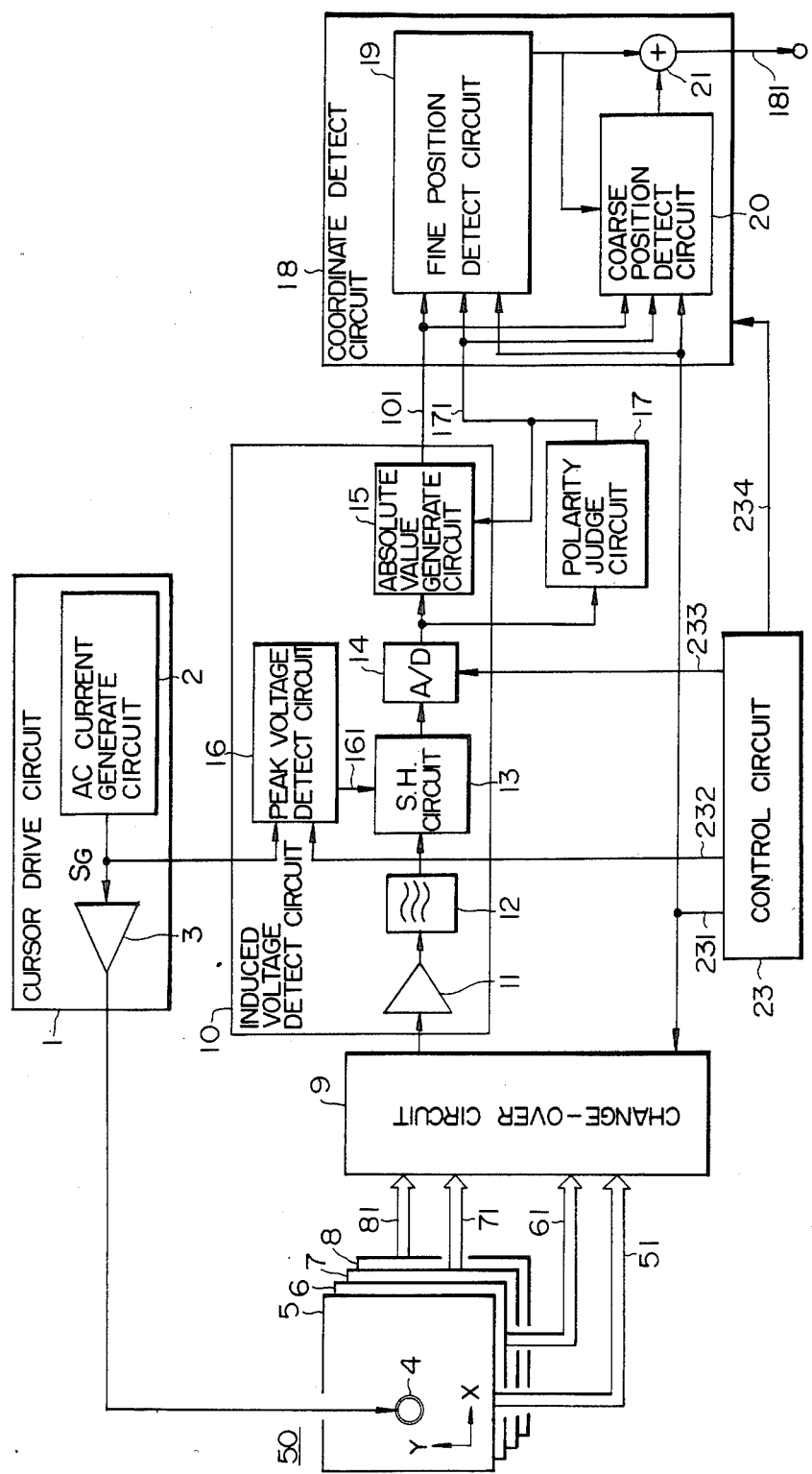
FIG. 1 is schematic block diagram illustrating a first embodiment of the coordinate position determining apparatus according to the present invention.

FIG. 1 shows the first embodiment of the present invention. The apparatus of the first embodiment includes a cursor drive circuit 1, a cursor 4, a coordinate read device 50, a change-over circuit 9, an induced voltage detect circuit 10, a coordinate detect circuit 18, and a control circuit 23. The cursor drive circuit 1 has an AC signal generate circuit 2 and an amplifier 3. An AC signal generated in the AC signal generate circuit 2 is amplified by the amplifier 3 and the amplified AC signal $S_G$ is supplied to the cursor 4. The cursor 4 contains therein a coil winding.

The induced voltage detect circuit 10 includes an amplifier 11, a filter 12, a sample and hold circuit 13, an analogue/digital (A/D) converter 14, an absolute value generate circuit 15, and a peak voltage detect circuit 16.

The peak voltage detect circuit 16 is supplied with the AC signal $S_G$ from the AC signal generate circuit 2 and an output signal 232 from the control circuit and delivers an output signal 161 to a control terminal of the sample and hold circuit 13.

The coordinate read device 50 includes four planar grid structures 5, 6, 7, and 8 each detecting induced voltages caused to appear by the AC current $S_G$ flowing through the cursor 4 located on the grid structure 5. Each of the grid structures 5-8 has an insulator substrate in or on which a plurality of position measuring conductors are formed. The position measuring conductors include elongated and spaced parallel conductors and a short portion of conductors connecting the spaced conductors. The grid stuuctures 5-6 detect a small change of the position (a fine position change) of the cursor 4, whereas the grid structures 7-8 detect a large change of the position (a coarse position change) of the cursor 4. For example, the grid structures 5 and 7 are used to detect a position of the cursor 4 in the x-axis direction, whereas the grid structures 6 and 8 are adopted to detect a position of the cursor 4 in the y-axis direction. The parallel conductors of the grid structure 5 and those of the grid structure 6 are arranged with an angle of 90° therebetween. This is also the case with the arrangement of the parallel conductors of the grid structures 7 and 8. The coordinate read device 50 delivers output signals 51, 61, 71, and 81 via the change-over circuit 9 to the induced voltage detect circuit 10.

The coordinate detect circuit 18 comprises a fine position detect circuit 19, a coarse position detect circuit 20, and an adder 21. The fine position detect circuit 19 delivers an output signal to an input terminal of the adder 21 and the coarse position detect circuit 20, which supplies an output signal to another input terminal of the adder 21. The adder 21 supplies an output signal as an output signal 181 of the coordinate detect circuit 18.

The change-over circuit 9, the induced voltage detect circuit 10, and the coordinate detect circuit 18 are controlled by the output signals 231-234 fed from the control circuit 23.

The induced voltage detect circuit 10 is also connected to a polarity judge circuit 17, which has an input terminal connected to an output terminal of the A/D converter circuit 14 constituting the induced voltage detect circuit 10. The polarity judge circuit 17 supplies an output signal 171 to the absolute value generate circuit 15 and the fine position detect circuit 19. The absolute value generate circuit 15 delivers an output signal to the fine position detect circuit 19 and the coarse position detect circuit 20.

Figure 2:
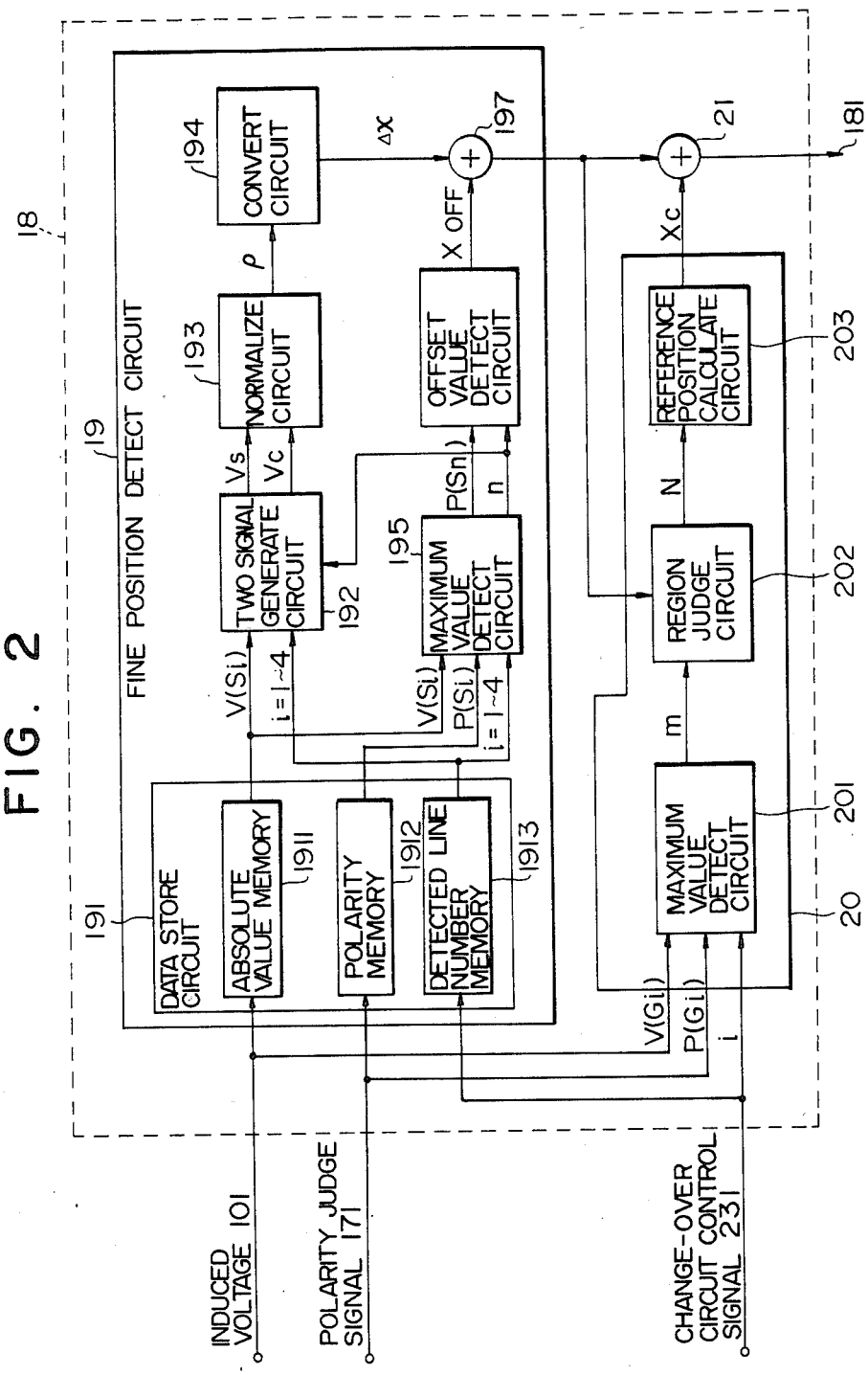
FIG. 2 is a block diagram schematically depicting a coordinate detect circuit.

In addition, as shown in FIG. 2, the fine position detect circuit 19 includes a data store circuit 191 comprising an absolute value memory 1911, a polarity memory 1912, and a number memory 1913, a two signal generate circuit 192, a normalize circuit 193, a convert circuit 194, a maximum value detect circuit 195, an offset value calculate circuit 196, and an adder 197.

The coarse position detect circuit 20 includes a maximum vauue detect circuit 201, a region judge circuit 202, and a reference position calculate circuit 203.

The output signal (AC signal) $S_G$ from the cursor drive circuit 1 causes a current to flow in a coil winding (not shown) included in the cursor 4 and hence an AC magnetic field appears in the periphery of the coil winding. When the cursor 4 is moved to a position near the grid structures 5-8, there are induced AC voltages in the position measuring conductors disposed on the grid structures 5-8 due to the AC magnetic field.

The change-over circuit 9 is controlled by the change-over circuit control signal 231 from the control circuit 23 to select one of the output signals 51-81 from the grid structures 5-8, respectively. The selected output signal is fed to the induced voltage detect circuit 10.

The control circuit 23 controls the change-over circuit 9 to sequentially select either one of the output signals 51-81 from the grid structures 5-8, respectively.

The induced voltage detect circuit 10 detects the magnitude of the AC induced voltage (to be referred to as an induced voltage value) selected by the change-over circuit 9.

The polarity judge circuit 17 indirectly judges to determine whether or not the phase of the AC induced voltage selected by the change-over circuit 9 is identical with that of a signal generated by the AC signal generate circuit 2 and supplies the result of the judgement to the coordinate detect circuit 18.

Based on the value of the induced voltage appearing in the grid structure 5, 6, 7, or 8 and the output signal 171 from the polarity judge circuit 17, the coordinate detect circuit 18 determines the position of the cursor 4.

In more detail, the fine position detect circuit 19 constituting the coordinate detect circuit 18 detects a fine position of the cursor 4 based on the value of the induced voltage appearing in the grid structure 5 and the output signal 171 from the polarity judge circuit 17; wherease the coarse position detect circuit 20 detects a coarse position of the cursor 4 based on the value of the induced voltage appearing in the grid structure 7 and the output signal from the fine position detect circuit 19. The coordinate detect circuit 18 adds the output signals respectively from the fine position detect circuit 19 to the coarse position detect circuit 20 by means of the adder 21 so as to determine a position of the cursor 4 in the x-axis direction. Similarly, the coordinate detect circuit 18 determines a position of the cursor in the y-axis by use of the output signals respectively from the grid structures 6 and 8.

In the apparatus of the present invention, the positions of the cursor 4 in the x-axis and y-axis directions are respectively determined in the similar fashion. As a consequence, the method for determining the cursor position will be described with respect to the x-axis.

Figure 3:
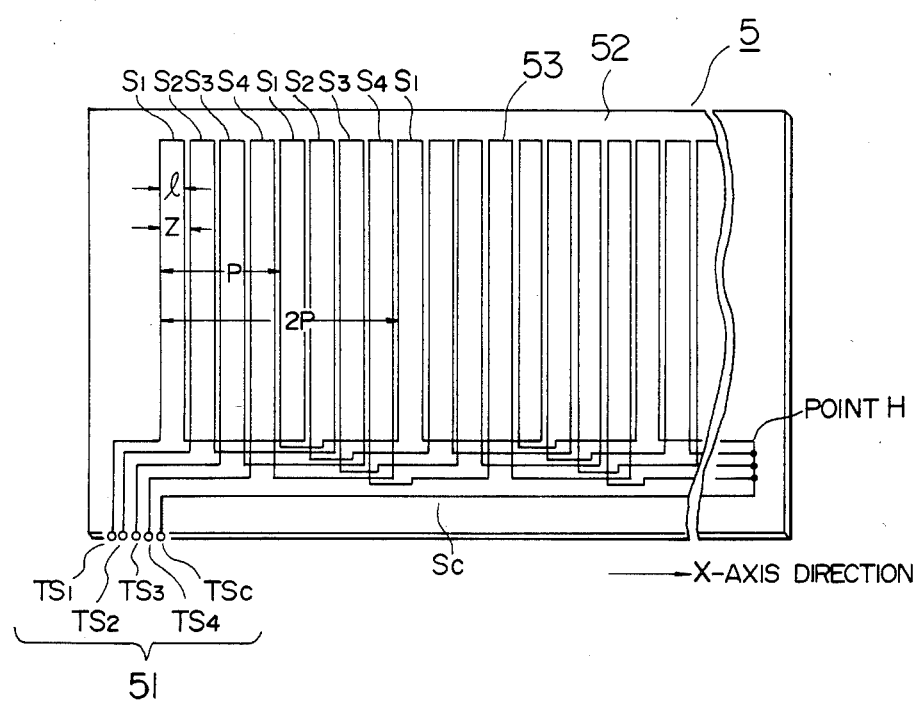
FIG. 3 is a schematic diagram showing a grid structure used to detect a small region.

FIG. 3 schematically shows the primary sections of the grid structure 5, which includes a position measuring conductor 53 formed on an insulator substrate 52. The position measuring conductor 53 includes detecting windings $S_1$, $S_2$, $S_3$, and $S_4$ and a common line $S_c$, which are located at an interval of a distance Z from each other.

Figure 4A:
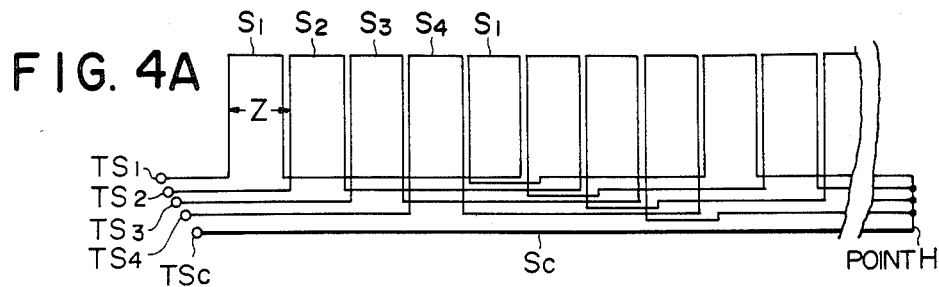
FIGS. 4A–4E are schematic diagrams illustrating a function of fine position sense lines of a grid structure detecting a small region.

As shown in FIGS. 3 and 4A, an end of each of the fine position sense lines $S_1$–$S_4$ is connected to the respective one of the terminals $TS_1$–$TS_4$ and the output signal 51 is fed to the change-over circuit 9.

The other ends of the fine position sense lines $S_1$–$S_4$ are connected to each other at a portion H of the diagram and are led from the connecting point H via the common line (return line) $S_C$ to a terminal $T_c$ disposed in the proximity of the terminals $TS_1$–$TS_4$.

The induced voltages appearing in the fine position sense lines $S_1$–$S_4$ are obtained as the induced voltages developed between the respective terminals $TS_1$–$TS_4$ and are supplied via the change-over circuit 9 to the induced voltage detect circuit 10.

Figure 4B:
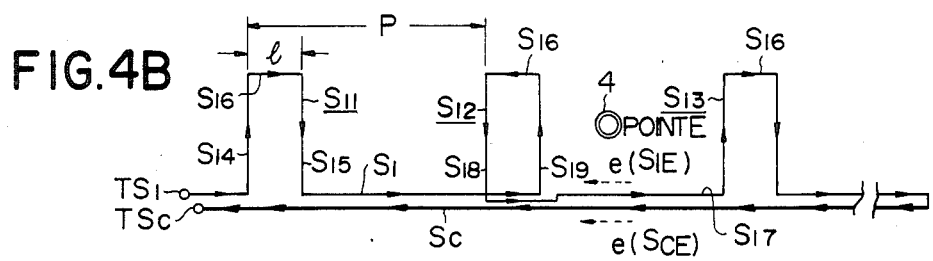

As shown in FIG. 4B, for example, the sense line $S_1$ includes parallel conductors $S_{11}$, $S_{12}$, and $S_{13}$, respectively disposed at an interval of a distance P. The direction of the current flowing through the parallel conductor $S_{11}$ is opposite to that of the current flowing through the parallel conductor $S_{12}$ as indicated by a plurality of arrow marks. The distance between the parallel portions $S_{14}$ and $S_{15}$ of the parallel conductor $S_{11}$ is l. The parallel portions $S_{14}$ and $S_{15}$ are connected by means of the short portion $S_{16}$. Incidentally, the sense line $S_1$ is apart from the sense line $S_2$ by a distance $Z=P/4$.

Figure 4C:
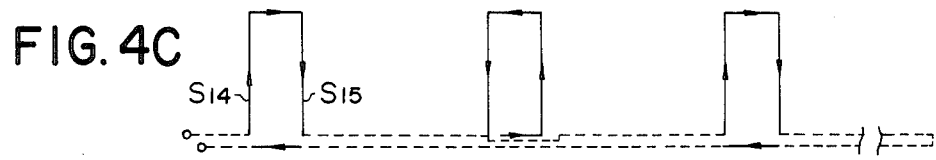
Figure 4D:
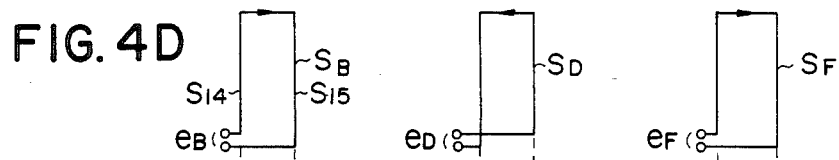

As shown in FIGS. 4C–4D, the loop $S_B$ comprises the parallel portions $S_{14}$–$S_{15}$, the short portion $S_{16}$, and the return conductor $S_C$. The loops $S_D$ and $S_F$ each also include, like the loop $S_B$, the parallel conductors $S_{12}$–$S_{13}$. The current flows in the loops $S_B$–$S_F$ in the same direction, whereas the direction of the current flowing through the loop $S_B$ is opposite to that of the current flowing through the loop $S_D$. The connecting portion $S_7$ is disposed in the neighborhood of the return conductor $S_C$, the direction of the current flowing through the connecting portion $S_{17}$ is opposite to that of the current flowing through the return conductor $S_C$, and hence the currents of the $S_{17}$ and $S_C$ are canceled by each other. For example, even when the cursor 4 is located at the point E, the induced voltage e $(S_{IE})$ developed at the connecting portion $S_{17}$ is substantially equal to the induced voltage e $(S_{CE})$ appearing in the return conductor $S_C$.

$$(S_{IE}) \div e\ (S_{CE})$$

Consequently, the voltages e $(S_{IE})$ and e $(S_{CE})$ cancel each other and hence there does not appear an induced voltage or current between the terminals $TS_1$ and $T_{SC}$.

Since the parallel portions $S_{14}$ and $S_{15}$ or the parallel portions $S_{18}$ and $S_{19}$ are arranged with a distance l therebetween, for example, the induced voltage developed in the parallel portion $S_{18}$ is different from that appearing in the parallel portion $S_{19}$.

Figure 4E:
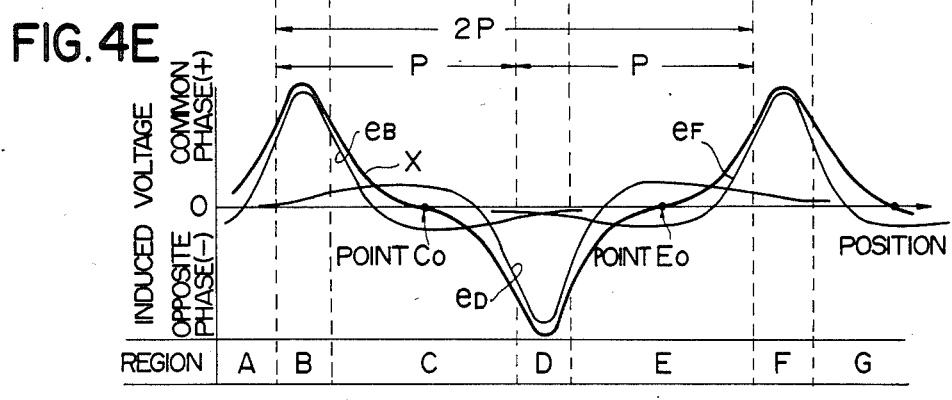

FIG. 4E shows induced voltages $e_B$, $e_D$, and $e_F$ to be developed in the loops $S_B$, $S_C$, and $S_F$, respectively. The voltage indicate by a solid line X is a voltage appearing between the terminals $T_{S1}$ and $T_{SC}$, and this voltage can be attained as a sum of the values of the induced voltages $e_B$, $e_D$, and $e_F$. When the cursor 4 is located in a region A, C, or E, the values of the induced voltage $e_B$, $e_D$, and $e_F$ of the loops $S_B$, $S_D$, and $S_F$, respectively are small.

The voltage X becomes zero at the centers $C_o$ and $E_o$ of the regions C and E, respectively. In the region B, D, or F, the peak value of the induced voltage appearing in the loop $S_B$, $S_D$, or $S_F$ takes the maximum value. However, in the regions B and F, the phase of the AC induced voltages are identical, whereas, in the regions B and D, the phases are opposite to each other.

The induced voltage developed in the same line $S_1$, $S_2$, $S_3$, or $S_4$ repeatedly takes the same value at an interval of the distance $2 \times P$.

As shown in FIG. 5A, the sense lines $S_1$–$S_4$ are arranged with an interval of a distance $Z=P/4$ therebetween. Consequently, peak voltages v(1)–v(4) of the induced voltages in the respective sense lines $S_1$–$S_4$ change depending on the position of the cursor 4 as shown in FIG. 5B. Namely, when the cursor is located at a point A of FIG. 5A, that is, in the sense line $S_3$, the value of the induced voltage v(3) at the terminal $TS_3$ (FIG. 5B) takes the maximum value, which is greater than the value of the induced voltage v(1), v(2), or v(3) developed at the terminal $TS_1$, $TS_2$, or $TS_4$, respectively. In regions $A_1$–$A_4$ of FIG. 5F, the phases of induced voltages v(1)–v(4) in the sense lines $S_1$–$S_4$ are identical (+) with the phase of the AC signal in the cursor 4 as shown in FIGS. 5B and 5E. In regions $A_5$–$A_8$ of FIG. 5F, the phases of the induced voltages v(1)–v(4) appearing in the sense lines $S_1$–$S_4$ are opposite (−) to the phase of the AC signal flowing through the cursor 4 as shown in FIGS. 5B and 5E. However, as can be seen from FIGS. 5C–5D, the amplitudes V(1)–V(4) of the induced voltages in the respective sense lines $S_1$–$S_4$ are the same in the regions $A_1$–$A_8$.

The region $A_3$ where the cursor 4 exists is found if the maximum voltage V(3) of FIG. 5D and the phases shown in FIG. 5E are detected.

According to the present invention, the amplitudes V(1)–V(4) and phases of the respective induced voltages are appropriately detected to determine the position of the cursor 4, which will be later described in details.

Figure 6:
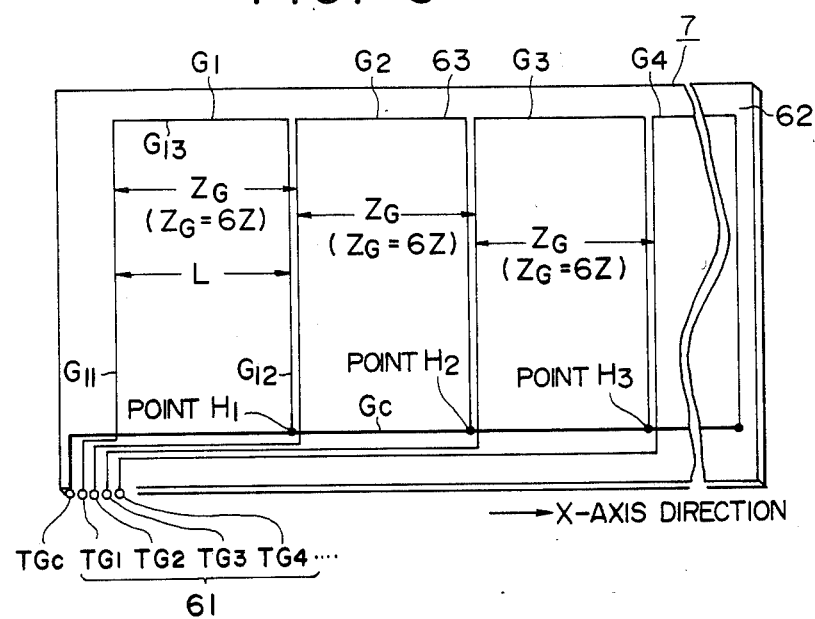
FIG. 6 is a schematic diagram showing a grid structure used to detect a large region.

FIG. 6 is a schematic diagram illustrating primary sections of the grid structure 7. The grid structure 7 includes a position measuring conductor 63 formed on an insulator substrate 62. The conductor 63 comprises sense lines (detecting windings) $G_1$–$G_3$ and a common line (a return line) $G_C$. The sense lines $G_1$–$G_3$ each have a width L and are disposed with an interval of a distance $Z_G$ therebetween. The sense lines $G_1$–$G_3$ are connected to terminals $T_{G1}$–$T_{G3}$, respectively, whereas the return line $G_C$ is connected to a terminal $T_{GC}$. In addition, the sense lines $G_1$–$G_3$ are connected to the return line $G_C$ at connecting points $H_1$–$H_3$, respectively. The distance $Z_G$ is set to be less than the distance $2 \times P$ between the sense lines of the grid structure 5. In FIG. 6, the distance $Z_G$ is selected to be $6 \times Z$ ($6 \times Z < 8 \times Z = 2 \times P$).

The induced voltages at the $T_{G1}$-$T_{G4}$ are supplied via the change-over circuit 9 to the induced voltage detect circuit 10. Also in the grid structure 6, loops $G_i$, $G_{i+1}$, and $G_{i+2}$ are constituted from parallel conductors $G_{11}$-$G_{12}$, a connecting line $G_{13}$ connecting the parallel conductors $G_{11}$-$G_{12}$, and a return line $G_C$ as shown in FIG. 7A. FIG. 7B is a graph depicting induced voltages $V(G_i)$, $V(G_{i+1})$ and $V(G_{i+2})$ respectively appearing in the loops $G_i$, $G_{i+1}$, and $G_{i+2}$ disposed in region $AG_i$, $AG_{i+1}$, and $AG_{i+2}$ of FIG. 7C. For example, when the cursor 4 is located at the point A in the region $AG_{i+1}$, an induced voltage with an amplitude $V_a$ is developed across the terminals $T_{Gi+1}$ and $T_{GC}$ of the loop $G_{i+1}$, the induced voltage having the same phase as that (+) of the AC signal $S_G$ passing through the cursor 4. At the terminals $TG_i$, $TG_{i+2}$, and $TG_{i+3}$ respectively of the loop $G_i$, $G_{i+2}$, and $G_{i+3}$, there are developed induced voltages with the respective amplitudes $V_c$, $V_d$, and $V_b$ each having a phase (−) opposite to the phase of the AC signal $S_G$ passing through the cursor 4. Consequently, by detecting a sense line $G_{i+1}$ in which the maximum induced voltage is developed with a phase identical to the phase of the AC signal $S_G$ passing through the cursor 4, a region $AG_{i+1}$ where the cursor exists can be determined.

The induced voltage 51 appearing at the terminals $TS_1$-$TS_4$ of the grid structure 5 and the induced voltage 61 developed at the terminals $TG_1$-$TG_i$ of the grid structure 7 are supplied to the change-over circuit 9, which includes a plurality of analogue switches (not shown). The change-over circuit 9 is controlled by the control circuit 23 and delivers the signals 51, 61, 71, or 81 respectively sent from the grid structure 5, 6, 7, or 8 of the coordinate read device 18 to the amplifier circuit 11. For example, the change-over circuit 9 sequentially supplies to the amplifier circuit 11 the induced voltages v(1)-v(4) from the respective terminals $TS_1$-$TS_4$ of the grid structure 5 by effecting the changeover operation on the induced voltages v(1)-v(4) and then achieves the change-over operation sequentially for the induced voltages $v(G_i)$, $v(G_{i+1})$, and $v(G_{i+2})$ respectively from the terminals $TG_i$, $TG_{i+1}$, and $TG_{i+2}$ of the grid structure 7 so as to generate a serial signal, which is supplied to the amplifier circuit 11. Thereafter, the output signals from the grid structures 6 and 8 are sequentially fed to the amplifier circuit 11.

FIGS. 8A-8C show functions of the change-over circuit 9. During a period $T_1$ from time $t_1$ to time $t_2$, a switch $S_1$ (FIG. 8B) connected to the sense line $S_1$ of the grid structure 5 turns on, an induced voltage $\tilde{v}(S_1)$ appearing in the sense line $S_1$ is selected by the change-over circuit 9, and then the induced voltage $\tilde{v}(S_1)$ thus selected is delivered to the amplifier circuit 11. At the time $t_2$, the switch $SW_1$ turns off. During a period $T_2$ from time $t_2$ to time $t_3$, a switch $S_2$ connected to the sense line $S_2$ turns on and an induced voltage $\tilde{v}(S_2)$ appearing in the sense line $S_2$ is selected by the change-over circuit 9. The switch $S_2$ turns off at the time $t_3$. During a period $T_3$ from time $t_3$ to time $t_4$, a switch $S_3$ connected to the sense line $S_3$ is set to ON and an induced voltage $\tilde{v}(S_3)$ developed in the sense line $S_3$ is selected by the change-over circuit 9. The switch $S_3$ is set to OFF at the time $t_4$. During a period $T_4$ from time $t_4$ to time $t_5$, a switch $S_4$ turns on and an induced voltage $\tilde{v}(S_4)$ appearing in the sense line $S_4$ is selected by the change-over circuit 9. At the time $t_5$, the switch $S_4$ turns off and a switch $SW_{G1}$ turns on, which causes an induced voltage $\tilde{v}(G)$ developed in the sense line G1 of the grid structure 7 to be selected by the change-over circuit 9 so as to be delivered to the induced voltage detect circuit 10. The induced voltages appearing in the grid structures 5 and 7 are repetitiously changed over by means of the change-over circuit 9 to generate a serial signal, which is then fed to the amplifier circuit 11.

The induced voltage detect circuit 10 is provided to detect the magnitude of an induced voltage signal $\overline{V}(i)$ (i=1, 2, . . . ) appearing in a sense line $S_i$ or $G_i$ (i=1, 2, . . . ) selected by the change-over circuit 9. For this purpose, the induced voltage signal $\overline{V}(i)$ is first amplified by the amplifier 11 and then an unnecessary noise included in the induced voltage signal $\overline{V}(i)$ is removed by the filter 12. The resultant induced voltage signal $\overline{V}(i)$ is delivered to the sample and hold circuit 13, which is controlled by an output signal from the peak voltage detect circuit 16 so as to sample the peak value of the amplitude of the induced voltage signal $\overline{V}(i)$ and to hold the sampled voltage.

Figure 9:
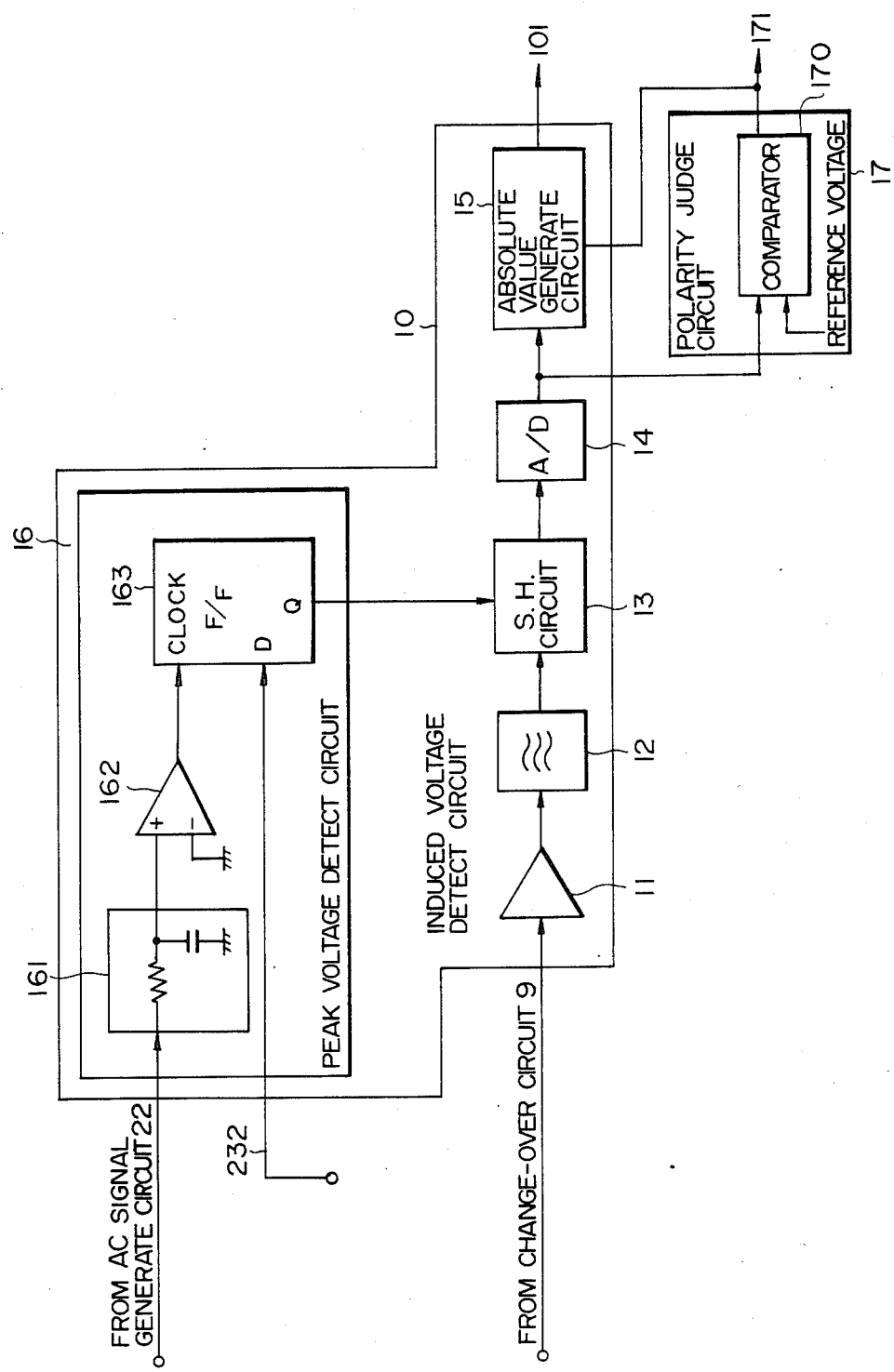
FIG. 9 is a block diagram schematically showing an induced voltage detect circuit.

FIG. 9 shows the configuration of the peak voltage detect circuit 16, which comprises a low-pass filter 161, a comparator 162, and a D-type flip-flop 163. The low-pass filter 161 has a corner frequency (a cut-off frequency) fc set to be sufficiently smaller than the frequency fo of the output signal $S_G$ from the AC signal generate circuit 2. As a consequence, at the output of the low-pass filter 161, there is attained a signal having a phase shifted by 90° with respect to that of the output signal $S_G$ (FIG. 10A) from the AC signal generate circuit 2 (FIG. 10B). By comparing the signal of which the phase has been shifted by 90° with the predetermined 0 volt, the comparator 162 generates a rectangular wave signal $S_C$ which rises at a timing associated with the positive peak value of the AC signal $S_G$ as shown in FIG. 10C and then supplies the signal $S_C$ to the Clock terminal of the D-type flip-flop 163. The Data input terminal of the D-type flip-flop 163 is supplied with the sample and hold control signal 232 (FIG. 10) sent from the control circuit 23 at the predetermined timing. From the output terminal Q of the D-type flip-flop 163, in response to the sample and hold control signal 232 thus inputted, for example, at the positive going edge of the rectangular wave signal $S_C$, the sampling signal $S_F$ is delivered at the time $t_1$. Namely, as shown in FIG. 10E, at the timing (time $t_1$) of the positive peak value of the AC signal $S_G$, a sample and hold signal $S_F$ is generated and is supplied to the sample and hold circuit 13. At the time $t_1$, the peak value of the induced voltage $\tilde{v}(S_n)$ appearing in the sense line $S_n$ is sampled and held by the sample and hold circuit 13.

When the change-over circuit control signal 231 used to select a sense line $S_{n+1}$ is fed to the changeover circuit 9 at the time $t_2$, the sample and hold circuit 13 is supplied with the induced voltage $\tilde{v}(S_{n+1})$ developed in the sense line $S_{n+1}$. At the time $t_3$, the operation to sample the induced voltage $\tilde{v}(S_{n+1})$ is started and then the peak value of the induced voltage $\tilde{v}(S_{n+1})$ is held. In FIGS. 10A and 10G, since the AC signal $S_G$ and the induced voltage $\tilde{v}(S_n)$ have the same phase, a positive peak value of the induced voltage $\tilde{v}(S_n)$ is sampled and held at the time $t_1$. On the other hand, the phase of the AC signal $S_G$ is different from that of the induced voltage $(S_n)$ by 180°, and hence a negative peak value of the induced voltage $\tilde{v}(S_{n+1})$ is sampled and held at the time $t_4$.

The voltages $\tilde{v}(S_n)$ and $\tilde{v}(S_{n+1})$ held by the sample and hold circuit 13 are converted into digital values by the A/D converter 14 as shown in FIGS. 10A-10I. Assuming the output signals from the A/D converter 14 from the induced voltages $\widetilde{V}(S_n)$ and $\widetilde{V}(S_{n+1})$ to be V ($S_n$) and V ($S_{n+1}$), respectively, the values of the output signals V ($S_n$) and V ($S_{n+1}$) take a positive value and a negative value, respectively and indicate amplitudes of the induced voltages $\widetilde{V}(S_n)$ and $\widetilde{V}(S_{n+1})$, respectively.

The polarity judge circuit 17 includes a comparator 170 and judges to determine whether the phase of the induced voltage $\widetilde{V}(S_n)$ is the same (+) as that of the AC signal $S_G$ or is opposite (−) to that of the AC signal $S_G$ depending on whether the output from the A/D converter 14 is greater or less than the reference voltage (zero volt in this case), namely, whether the output is a positive value or not. Although the amplifier 170 is a comparator to compare digital signals, a comparator may be adopted in which the comparison is effected according to analogue values with the output signal from the sample and hold circuit 13 being supplied as an input signal.

The output signal 171 from the polarity judge circuit 17 is supplied to the coordinate detect circuit 18 as well as to the absolute value generate circuit 15 constituting the induced voltage detect circuit 10.

Based on the output result from the polarity judge circuit 17, if the output signal from the A/D converter 14 has a negative value, the absolute value generate circuit 15 converts the value to a positive value.

That is, the induced voltage detect circuit 10 detects the magnitude of the amplitude of the induced voltage $\widetilde{V}(S_n)$ appearing in the sense line $S_n$ and sequentially delivers the signal V ($S_n$) to the coordinate detect circuit 18.

The coordinate detect circuit 18 determines the position of the cursor 4 based on the change-over circuit control signal 231 from the control circuit 23 (a code signal corresponding to the sense line $S_n$ to be selected; to be referred to as a sense line number herebelow), the magnitude V ($S_n$) of the induced voltage $\widetilde{V}(S_n)$ developed in the sense line $S_n$ detected by the induced voltage detect circuit 10, and the judgement result on the polarity of the phase of the induced voltage $\widetilde{V}(S_n)$ detected by the polarity judge circuit 17.

FIG. 2 shows the details of the coordinate detect circuit 18.

In the fine position detect circuit 19, in response to the output signal 234 from the control circuit 23, the numbers 1–4 respectively of the fine position sense lines $S_1$–$S_4$, the induced voltages V(1)–V(4) respectively developed in the sense lines $S_1$–$S_4$, and the judge results P(1)–P(4) from the polarity judge circuit 17 are temporarily stored in the data store circuit 191. Namely, the induced voltages V(1)–V(4), the polarity judgement results P(1)–P(4), and the numbers 1–4 respectively of the sense lines $S_1$–$S_4$ are stored in the absolute value memory 1911, the polarity memory 1912, and the sense line number memory 1913, respectively.

The fine position detect circuit 19 detects the position of the cursor 4 according to the data stored in the data store circuit 191. The output signals v(1)–v(4) respectively of the sense lines $S_1$–$S_4$ take the same value at an interval of a distance 2P as shown in FIG. 5B. Consequently, the fine position detect circuit 19 cannot judge to determine the region $AS_{i-1}$, $AS_i$, or $AS_{i+1}$ of FIG. 5F in which the cursor 4 exists. However, if the cursor 4 exists in the region $AS_i$, the fine position detect circuit 19 can calculate the position of the cursor 4 by use of the reference point $R_i$.

The maximum value detect circuit 195 detects the maximum value of the induced voltages V(1)–V(4) and outputs a number n of a fine position sense line that delivers the maximum value. The value of n ranges from one to four.

If the cursor 4 exists here at the position of the point A as shown in FIG. 5A, the induced voltage V(3) of the fine position sense line $S_3$ takes the maximum value among the induce voltages V(1)–V(4) respectively of the fine position sense lines $S_1$–$S_4$ as shown in FIG. 5D. Consequently, the number n of the output signal from the maximum value detect circuit 195 is set to 3, which means that the cursor 4 exists in a small area $A_3$ or $A_7$ among the small regions $A_1$–$A_8$ obtained by dividing the region or area $AS_i$ by eight as shown in FIG. 5F.

Furthermore, depending on the polarity for the AC signal $S_G$ associated with the induced voltage V(3) appearing in the fine position sense line $S_3$, namely, the polarity judge signal P(3) stored in the polarity memory 1912, the cursor 4 can be determined to exist in the small region $A_3$ or $A_7$. At the position A of the cursor 4 in FIG. 5A, the induced voltage V(3) has a positive phase (+), and hence the cursor 4 is judged to exist in the small region $A_3$.

The maximum value detect circuit 195 outputs a sense line number n and a polarity judge signal P(n) of the induced voltage associated therewith to the offset value calculate circuit 196.

As described above, based on the sense line number n and the polarity judge signal P(n) of the induced voltage, the offset value calculate circuit 196 detects which one of the small regions $A_1$–$A_8$ includes the cursor 4 and then calculates the offset value relative to the reference point $R_i$.

The width of each of the small regions $A_1$–$A_8$ is equal to the shift width Z disposed between the fine position sense lines $S_1$–$S_4$, and hence the offset value $X_{OFF}$ is obtained as follows.

$$X_{OFF} = \begin{cases} (n-1) \cdot Z & P(n) \text{ with the same phase} \\ (n-1) \cdot Z + 4Z & P(n) \text{ with the opposite phase} \end{cases} \quad (1)$$

where, n is a number (1–4) of a fine position sense line generating the maximum induced voltage and P(n) is the polarity of the fine position sense line with the line number n.

The precise position of the cursor 4 in the small region or area thus detected is obtained by means of the two signal generate circuit 192, the normalize circuit 193, and the position convert circuit 194 as follows.

First, in the two signal generate circuit 192, based on the sense line number n and the induced voltages V(1)–V(4) respectively appearing in the fine position sense lines $S_1$–$S_4$, two composite voltages $V_S$ and $V_C$ are calculated as follows.

$$V_S = V(n) + V(n+1) - V(n+2) - V(n-1) \quad (2)$$

$$V_C = V(n) - V(n+1) - V(n+2) + V(n-1) \quad (3)$$

where, V(i) indicates an induced voltage of a fine position sense line $S_i$ and i=1 for n−1=0 and i=n+j−4 for n+j>4. Namely, for n=3, the voltages V(n), V(n+1), V(n+2), and V(n−1) correspond to the induced voltages V(3), V(4), V(1), and V(2) of the fine position sense lines $S_3$, $S_4$, $S_1$, and $S_2$, respectively.

In other words, the voltage value V(n+1) is an induced voltage of a fine position sense line $S_{n+1}$ of which the loop is located on the right side of the loop of the fine position sense line $S_n$, the voltage value V(n−1) is an induced voltage of the fine position sense line $S_{n-1}$ of which the loop is located on the left side of the loop of the fine position sense line $S_n$, and the voltage value V(n+2) is an induced voltage of the fine position sense line $S_{n+2}$ of which the loop is located at a position having the greatest distance from the loop of the sense line $S_n$ among the positions associated with the four fine position sense lines.

Figure 11A:
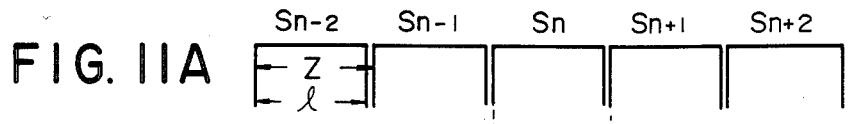
FIGS. 11A–11E are graphs depicting waveforms of signals in the fine position detect circuit.
Figure 11B:
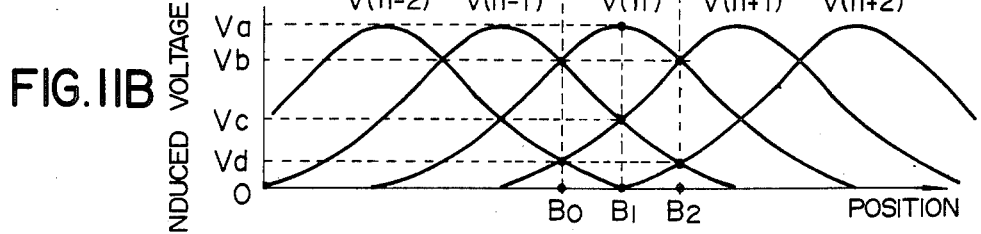

As shown in FIG. 11A, the respective fine position sense lines $S_n$ are arranged with an interval of the distance Z÷1 therebetween, and hence the induced voltages appearing in these fine position sense lines are obtained as illustrated in FIG. 11B. This diagram shows the induced voltage characteristics of the fine position sense lines each having a loop centered on the sense line $S_n$, namely, this is a magnified version of a portion of FIG. 5C.

Assume the left end, the right end, and the center of the loop portion of the fine position sense line $S_n$ to be denoted as points $B_0$, $B_2$, and $B_1$, respectively. At the point $B_0$, the induced voltage V(n) is equal to the induced voltage V(n−1), namely, the voltage value is $V_b$; whereas the induced voltage V(n+1) is equal to the induced voltage V(n−1), namely, the voltage value is $V_d$. In addition, at the point $B_2$, the induced voltages V(n) and V(n+1) take the same value $V_b$, whereas the induced voltages V(n−1) and V(n+2) are set to the voltage value of $V_d$. Moreover, at the point $B_1$, the induced voltage V(n) takes the maximum value $V_a$, the induced voltages V(n−1) and V(n+1) are set to the voltage value $V_c$, and the induced voltage V(n+2) is zero volt. The relationships of the voltage values $V_a$, $V_b$, $V_c$, and $V_d$ with respect to the magnitude are represented as $V_a > V_b > V_c > V_d$.

Figure 11C:
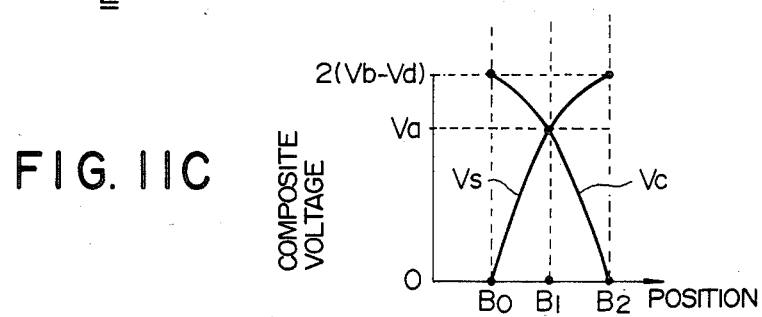

For the movement of the cursor 4, the respective fine position sense lines $S_{n-2}$, $S_{n-1}$, $S_n$, $S_{n+1}$, and $S_{n+2}$ develop the induced voltage characteristics as shown in FIG. 11B, and hence the composite voltages $V_s$ and $V_c$ from the two signal generate circuit 192 are obtained as illustrated in FIG. 11C. The composite voltage $V_s$ is 0 volt at the point $B_0$ and gradually increases to be a voltage $V_a$ at the point $B_1$; moreover, the voltage $V_s$ grows up to $2 \times (V_b - V_d)$ at the point $B_2$. The composite voltage $V_c$ takes a value of $2 \times (V_b - V_d)$ at the point $B_0$. Contrary to the change of the composite voltage $V_s$, the value of $V_c$ gradually lowers to be a voltage $V_a$ at the point $B_1$ and further becauses to be zero volt at the point $B_2$.

The normalize circuit 193 calculates the relative magnitude of the composite voltages $V_s$ and $V_c$, namely, the normalized value ρ according to the following formula.

$$\rho = \frac{V_s}{\sqrt{V_s^2 + V_c^2}} \quad (4)$$

Figure 11D:
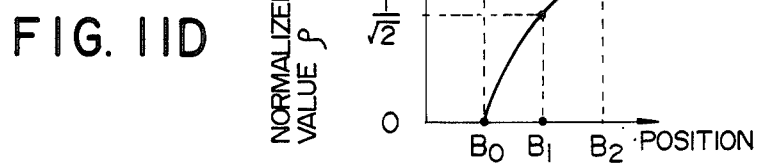

Since the composite voltages $V_s$ and $V_c$ are symmetric with the point $B_1$ being the center of the symmetry (FIG. 11C), the normalized value ρ is zero at the point $B_0$ and gradually increases as the cursor 4 moves toward the point $B_2$ so as to take values $1\sqrt{2}$ and 1 at the points $B_1$ and $B_2$, respectively. If the induced voltage characteristics of the fine position sense lines (FIG. 11B) satisfy a relationship of $2(V_b - V_d) > V_a$, the characteristic of the normalized value ρ is represented as shown in FIG. 11D. Namely, in the range from 0 to 1 of the normalized value ρ, there exists a one-to-one correspondence between the value of ρ and the position in the loop of the sense line $S_n$.

As a consequence, the position Δx in the loop portion can be detected by obtaining the normalized value ρ.

The normalize circuit 193 calculates the relative magnitude ρ of the composite voltages $V_s$ and $V_c$ from the two signal generate circuit 192 for the following reasons. Due to the change and fluctuation in the excitation AC voltage to drive the excitation winding and the fluctuation of the amplification by the amplifier 11 constituting the induced voltage detect circuit 10, there appear errors in the induced voltages $V_a$, $V_b$, $V_c$, and $V_d$ developed in the respective sense lines $S_n$, which leads to errors in the composite voltages $V_s$ and $V_c$. Consequently, the correct position of the cursor 4 in the loop portion cannot be detected directly from one or both of the induced values $V_s$ and $V_c$. To remove the influences of these changes and fluctuations and to attain a value indicating the correct position of the cursor 4 in the loop, the normalized value ρ is calculated to represent a relative magnitude of the composite voltages $V_s$ and $V_c$.

Based on the normalized value ρ, the convert circuit 194 calculates the position Δx of the cursor 4 in a loop portion of the sense line $S_n$.

Figure 11E:
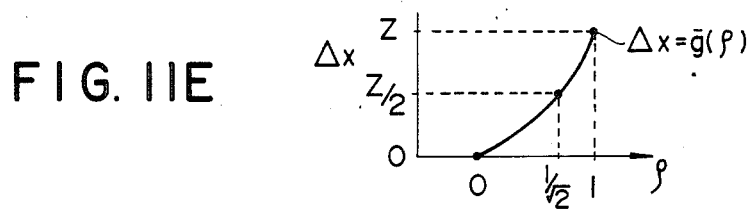

As shown in FIG. 11E, assuming Δx=0, Z/2, and Z(Z÷0) when the cursor 4 is located at the points $B_0$, $B_1$, and $B_2$, respectively, the normalized value ρ is expressed by a function which takes a value in the range of $0 \leq \rho \leq 1$ with respect to Δx in the range of $0 \leq \Delta x \leq Z$ as follows.

$$\rho = g(\Delta x)$$

If the function g(Δx) can be expressed as $\rho = 1/Z \cdot \Delta x$, the position Δx is obtained by use of the normalized value ρ as $\Delta x = Z \cdot \rho$. However, the function g(Δx) takes values nonlinear with respect to the position Δx as shown in FIG. 11D.

This problem can be solved as follows. If a function table satisfying $\Delta x = \bar{g}(\rho)$ for the inverse function $\bar{g}(\rho)$ of the function g(Δx) is beforehand experimentally obtained, the position Δx can be determined from the expression $\bar{g}(\rho)$ corrresponding to the normalized value ρ.

The position convert circuit 194 concretely includes a nonvolatile memory (for example, a read-only memory) and stores each value of the reverse function $\bar{g}(\rho)$ at an address indicated by the normalized value ρ. As shown in FIG. 11E, the value of the reverse function $\bar{g}(\rho)$ is in the range of $0 \leq \Delta x \leq Z$ for the value of ρ in the range of $0 \leq \rho \leq 1$. Naturally, the value of Δx for the value of ρ at each point obtained by equally dividing the distance Z (the axis of ordinate) is stored in the position convert circuit 194. Consequently, the normalized value ρ obtained by the normalize circuit 193 is supplied to the convert circuit 194, which in turn outputs the position Δx in a loop portion of the sense line $S_n$.

The position signal Δx thus attained and the offset signal $X_{OFF}$ are added by the adder 197 to generate a position signal $X_I(=X_{OFF}+\Delta x)$ indicating a position relative to the reference point $R_i$ of the region $AS_i$ as shown in FIGS. 12A-12C. The resultant signal is outputted as an output signal from the fine position detect circuit 19.

As can be seen from FIGS. 12A-12C, the position signal $X_I$ is repetiously attained for each period of $2P(=8Z)$; however, the absolute position of the cursor 4 cannot be determined only by the position signal $X_I$. It is necessary to detect the region $AS_i$ where the cursor 4 exists and to detect the position (coordinate value) of the reference point $R_i$ of the region $AS_i$.

The coarse position detect circuit 20 comprises, as shown in FIG. 2, a maximum value detect circuit 201, region judge circuit 202, and a reference position calculate circuit 203.

The maximum value detect circuit 201 sequentially receives the induced voltages $V(G_i)$ of the coarse position sense lines $G_i$ and the polarity judge signals $P(G_i)$ thereof respectively supplied from the induced voltage detect circuit 10 and the polarity judge circuit 17, detects a coarse position sense line $G_m$ which the induced voltage $V(G_i)$ has the same phase (+) as that of the AC signal $S_G$ and possesses the greatest value among the induced voltages $V(G_i)$, and outputs the line number m of the coarse position sense line $G_m$.

The polarity $P(G_i)$ has an essential meaning in the coarse position detect circuit 20, and the opposite phase (−) indicates that the cursor 4 is not located at a position within a loop of the coarse position sense line $G_i$. As shown in FIG. 7B, the maximum value detect circuit 20 outputs the number m of the coarse position sense line $G_m$ of which the phase $P(G_i)$ is the positive phase (+) and the induced voltage $V(G_i)$ has a large value.

The region judge circuit 202 judges to determine a region $AS_N$ where the cursor 4 is located and detects the number N of the region $AS_N$ based on the number m of the coarse position sense line $G_m$ obtained from the maximum value detect circuit 201, namely, the region $AG_m$ where the cursor 4 exists in the region $AG_i$ and the position signal $X_I$ received from the fine position detect circuit 19.

Referring now to FIGS. 13A-13D, description will be given of the detect algorithm associated with the number N of the region $AS_N$ where the cursor 4 is located. FIG. 13A shows the first regions $AS_i$ obtained through division with a period width 2P by a group of fine position sense lines, FIG. 13B is a graph schematically showing a characteristic of the position $x_I$ attained in the regions $AS_i$, and FIG. 13C shows the second regions $AG_j$ obtained through division with a width $Z_G$ by the coarse position sense line.

Since the period width $2P=8Z$ and the width $Z_G=6Z$ are assumed for the width Z of the fine position sense line, the positional relationship between the first and second regions is as shown in the diagram, namely, the regions repetitiously appear with a period of the width 24 x Z. The boundary portions respectively of the regions $AS_i$ and $AG_i$ are selected not to overlap with each other.

The region of the coarse position sense line $G_m$ developing the maximum induced voltage obtain from the maximum value detect circuit 201, namely, the second region $AG_m$ where the cursor 4 exists is to be included in one of the first regions or to astride two second regions adjacent to each other.

TABLE 1

| Middle region | Large region | Position X | Region number judge processing | |
|---|---|---|---|---|
| | | | Judge threshold value | Large region |
| $AG_j$ | $AS_{i-1}$ | $xa<XI$ | $TH_1<XI$ | $AS_{i-1}$ |
| | $AS_i$ | $XI \leq xb$ | $XI \leq TH_1$ | $AS_i$ |
| $AG_{j+1}$ | $AS_i$ | $xb<XI$ | $TH_2<XI$ | $AS_i$ |
| | $AS_{i+1}$ | $XI \leq xc$ | $XI \leq TH_2$ | $AS_{i+1}$ |
| $AG_{j+2}$ | $AS_{i+1}$ | $xc<XI$ | $TH_3<XI$ | $AS_{i+1}$ |
| | $AS_{i+2}$ | $XI \leq xd$ | $XI \leq TH_3$ | $AS_{i+2}$ |
| $AG_{j+3}$ | $AS_{i+2}$ | $xd<XI$ | $TH_4<XI$ | $AS_{i+2}$ |
| | $AS_{i+2}$ | $XI \leq Xa$ | $XI \leq TH_4$ | $AS_{i+3}$ |

Table 1 shows the relationships, based on FIGS. 3A-13C, among the second regions $AG_j$-$AG_{j+3}$, the first regions $AS_{i-1}$-$AS_{i+2}$, and the position $X_I$ in which positions $x_a$, $x_b$, $x_c$, and $x_d$ respectively denote the values of the position signal $X_I$ in the first regions at the boundary points of the second regions, namely, $x_a=7.5Z$, $x_b=5.5Z$, $x_c=3.5Z$, and $x_d=1.5Z$.

As shown in Table 1, even if a second region astrides two first regions, the range of the value of the position signal $X_I$ in each first region is different from each other and hence a single first region can be determined according to the value of the position signal $X_I$.

That is, as shown in the right side of the Table 1, the threshold values $TH_1$-$TH_4$ are beforehand set for the second regions $AG_j$-$AG_{j+3}$, respectively, so that depending on whether or not the position signal $X_I$ is greater than the threshold value $TH_1$, $TH_2$, $TH_3$, or $TH_4$, one of the first regions corresponding to the detected second region is determined.

Incidentally, the threshold values $TH_1$-$TH_3$ are selected as follows.

$$TH_1=(x_a+x_b)/2, \quad TH_2=(x_b+x_c)/2$$

$$TH_3=(x_c+x_d)/2$$

The threshold value $TH_4$ is set as $TH_4=(x_d+x_a-8Z)/2$.

The second region is detected, as shown in FIG. 7, by use of a number m assigned to the coarse position sense line $G_m$ developing the maximum induced voltage. However, on the boundaries $AG_i$ and $AG_{i+1}$ of the second region, the induced voltages appearing in the coarse position sense lines $G_i$ and $G_{i+1}$ are substantially equal to each other. Namely, in the neighborhood of a boundary, due to the fluctuation of arrangement of the coarse position sense lines, the fluctuation of the induction characteristics, and the like, it cannot be correctly determined which one of the coarse position sense lines $G_i$-$G_{i+1}$ develops the greatest induced voltage. Consequently, in some cases, the maximum value detect circuit 201 may detect the second region $AG_m$ corresponding to a number m of a coarse position sense line $G_m$ thus erroneously determined. However, the number of the correct region can be detected by achieving a comparison between the threshold values $TH_i$ corresponding to the detected second region and the position $X_I$. The range in which the wrong detection can be prevented is the range where the position signal $X_1$ cannot take a value in the second region, for example, in the region $AG_j$, this range corresponds to the range $x_b$-$x_a$, which is shown as a shade portion in FIG. 13D. Namely, even when a region a is detected to be in the region $AG_j$ or a region b is detected to exist in the region $AG_{j+1}$, the number of the correct region $AS_i$ can be calculated. The range in which the wrong detection can be prevented is increased when the width $Q=Z_G$ of the coarse region $AG_j$ is set as a small value as compared with the width 2P of the region $AS_i$.

Figure 14:
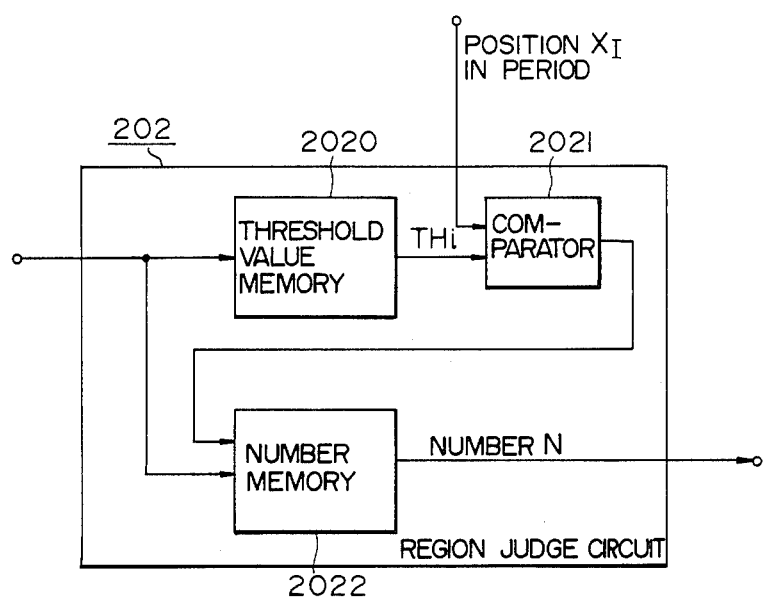
FIG. 14 is a block diagram showing a region judge circuit.

FIG. 14 shows the configuration of the region judge circuit 202 in which a threshold value memory 2020 stores the threshold values $TH_1$-$TH_4$ of the coarse position sense lines $G_i$ (i=1-4), respectively and a number memory 2022 stores the numbers of the regions $G_i$ and the number of the regions $AS_i$ associated with the output signal from the comparator 2021. On receiving as an input a coarse position sense line number m associated with the maximum value from the maximum value detect circuit 201, the threshold value memory 2020 outputs a threshold value $TH_i$ corresponding thereto by using the number m as an address signal. The comparator 2021 compares the threshold value $TH_i$ with the position signal $X_I$ supplied from the fine position detect circuit 19 and then outputs a compare output signal. The number memory 2022 outputs a region number N of the corresponding region by using as an address signal the compare output signal and the coarse position sense line number m.

The reference position calculate circuit 203 calculates the position (distance) $X_c$ of the reference point $R_N$ of the region $AS_N$ based on the number N attained from the region judge circuit 202. Assuming the regions $AS_1$, $AS_2$, ..., $AS_n$, ... to be arranged in the order beginning from the reference point of the coordinate axis, the width allocated to each region is $2P=8Z$; consequently, the position $X_c$ of the reference point $R_N$ of the region $AS_N$ corresponding to the number N is obtained as follows.

$$X_c = 2P \cdot (N-1)$$

Incidentally, since the distance $X_c$ is a value uniquely determined in association with the number of period N, if the distance signal $X_c$ corresponding to the number N is stored in the period number memory 2022 of the region judge circuit 202, the dsstance signal $X_c$ can also be obtained by use of the output signal from the region judge circuit 202.

In the adder 21, the distance signal $X_c$ delivered as an output signal from the coarse position detect circuit 20 is added to the position signal $X_I$ fed from the fine position detect circuit 19. The signal $X_c + X_I$ resulted from the addition is supplied as an output signal from the coordinate detect circuit 18.

Figure 15:
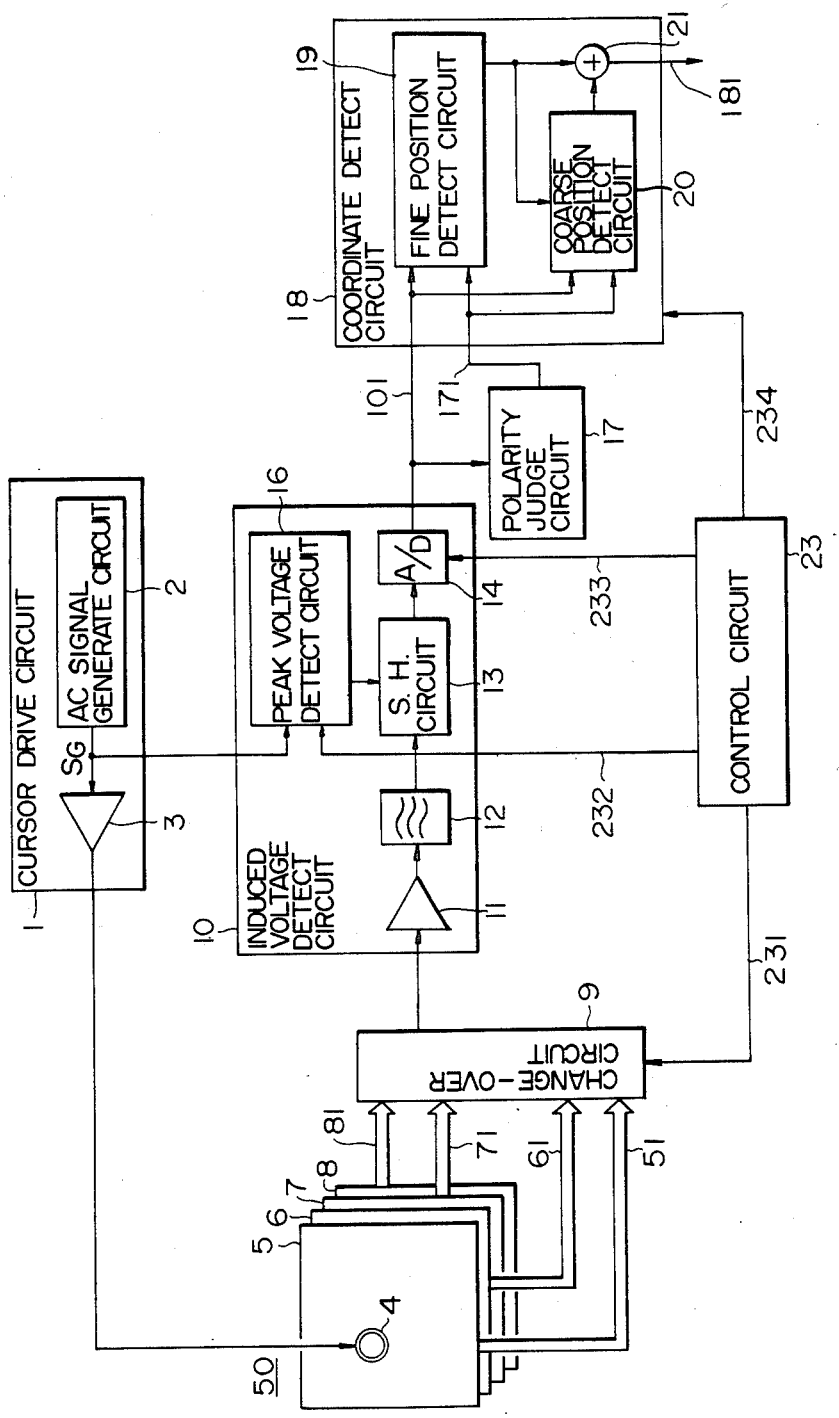
FIG. 15 is a block diagram illustrating a second embodiment of the present invention.
Figure 16:
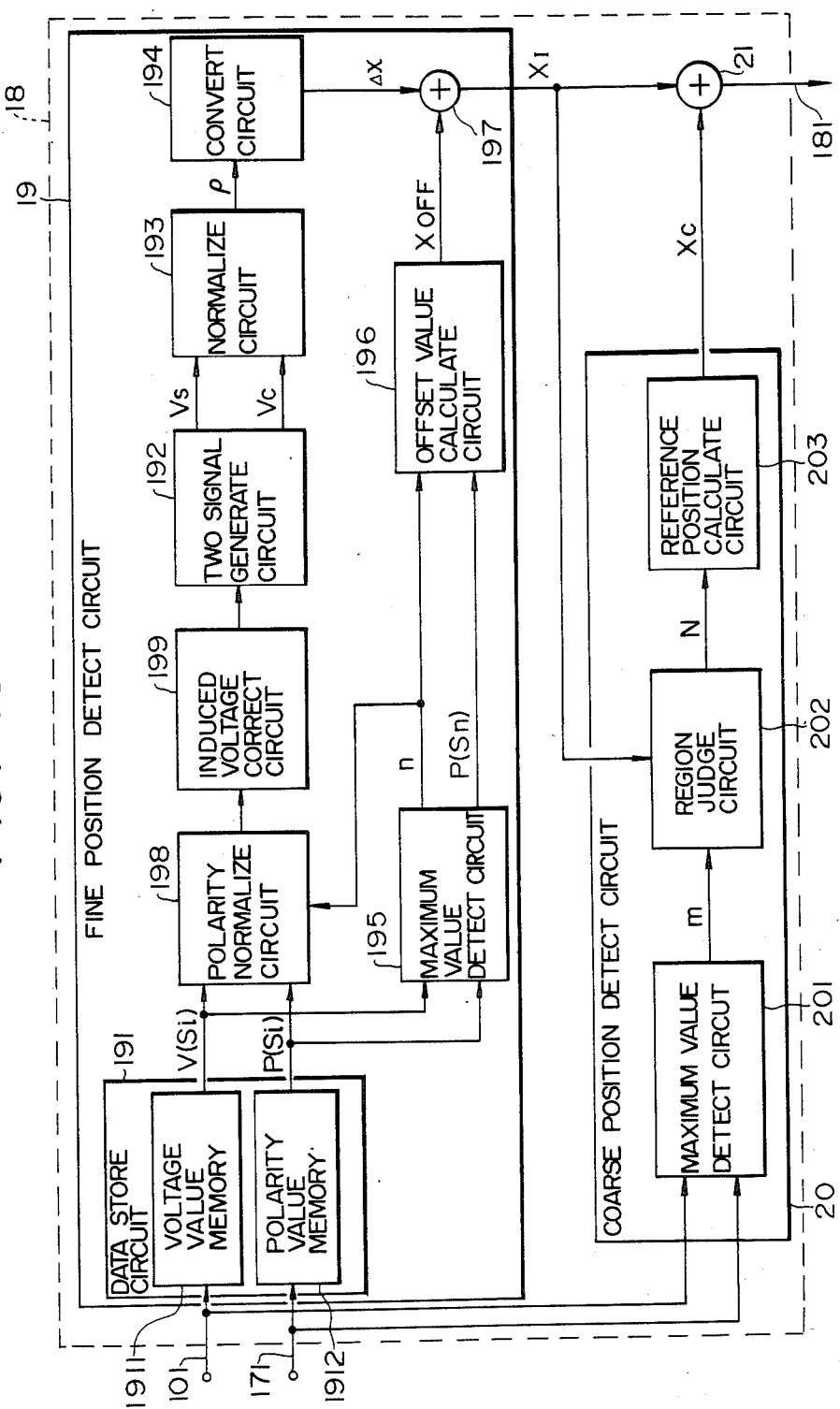
FIG. 16 is a schematic block diagram depicting a coordinate detect circuit of the second embodiment.

FIG. 15 is a block diagram of the second embodiment of the apparatus according to the present invention, whereas FIG. 16 is a schematic block diagram illustrating the coordinate detect circuit 18. In this embodiment, the induced voltage detect circuit 10 does not include an absolute value generate circuit. The data store circuit 191 of the fine position detect circuit 19 of the coordinate detect circuit 18 does not comprise a sense line number memory. However, the fine position detect circuit 19 includes a polarity normalize circuit 198 connected to the data store circuit 191 and an induced voltage correct circuit 199 linked to the polarity normalize circuit 198.

The apparatus of the second embodiment can correctly determine the position of the cursor 4 even when the cursor 4 is located on the coordinate read device 5 in an inclined state.

The fine position detect circuit 19 of this embodiment receives the induced voltages $V(S_1)$-$V(S_4)$ of the fine position sense lines $S_1$-$S_4$ sequentially delivered from the induced voltage detect circuit 10 and the polartty judge signals $P(S_1)$-$P(S_4)$ from the polarity judge circuit 17 and then temporarily stores the received data in the data store circuit 191. That is, the fine position detect circuit 19 stores the induced voltages $V(S_1)$ to $V(S_4)$ in a voltage value memory 1911 and the polarity judge signals $P(S_1)$-$P(S_4)$ in a polarity memory 1912, each signal being stored in a predetermined area therein corresponding to the number i of the fiee position sense line $S_i$.

The maximum value detect circuit 195 detects the maximum induced voltage among the induced voltages $V(S_1)$-$V(S_4)$ and then outputs the sense line number n associated therewith (to be referred to as a maximum value fine position sense line number herebelow) and the polarity judge result $P(S_n)$, where n ranges from one to four.

Assuming here the cursor 4 to be located at a position of the point A of FIG. 5A, the induced voltage $V(S_3)$ of the fin position sense line $S_3$ takes the maximum value as shown in FIG. 5D, and since the polarity judge signal $P(S_3)$ of the induced voltage $V(S_3)$ indicates the same phase (positive), the maximum value detect circuit outputs $n=3$, $P(S_3) = +1$.

The output from the maximum value detect circuit 195 enables to determine that the cursor 4 exists in the small region $A_3$ among the small rgions $A_1$-$A_8$ obtained by dividing the region $AS_i$ shown in FIG. 5F.

The offset value calculate circuit 196 is identical to that of FIG. 2.

The precise position of the cursor 4 in the detected small region is determined as follows by means of the induced voltage polarity normalize circuit 198, the induced voltage correct circuit 199, the two signal generate circuit 192, the normalize circuit 193, and the convert circuit 194.

Particularly, the operations of the polarity normalize circuit 198 and the induced voltage correct circuit 199 are characteristic features of the present invention and are provided to correct the change in the induced voltage due to the inclined state of the cursor 4.

First, the polarity normalize circuit 198 normalizes the porality of the induced voltage of each fine position sense line $S_i$ based on the induced voltage ($S_i$) of each fine position sense line $S_i$ (i=1-4) stored in the data store circuit 191, the polarity judge result $P(S_i)$ stored therein, the sense line number n obtained from the maximum value detect circuit 195, and the polarity judge signal $P(S_n)$ of the sense line associated with the sense line number n as follows, thereby outputting the induced voltages $V_T$, $V_R$, and $V_B$ each having the normalized polarity.

$$V_T = |V(S_n)|$$

$$V_L = CPL(n) \cdot P(S_n) \cdot V(S_n - 1)$$

$$V_R = CPR(n) \cdot P(S_n) \cdot V(S_n + 1)$$

$$V_B = CPB(n) \cdot P(S_n) \cdot V(S_n + 2)$$

where, CPL(n), CPR(n), and CPB(n) are polarity normalize coefficients each taking a value of 1 or $-1$ beforehand set corresponding to the number n; moreover $$n - j = (n - j) + 4 \text{ for } n - j < 1$$

$$n + j = (n + j) - 4 \text{ for } n + j > 4, \text{ and}$$

the polarity $P(S_n)$ is 1 for the same phase and $-1$ for the opposite phase.

The induced voltages $V_T$, $V_L$, $V_R$, and $V_L$ each having the normalized polarity respectively correspond to the induced voltage $V(S_n)$ of the fine position sense line $S_n$ developing the maximum induced voltage, the induced voltage $V(S_{n-1})$ of the fine position sense line $S_{n-1}$ located on the left of the fine position sense line $S_n$, the induced voltage $V(S_{n+1})$ of the fine position sense line $S_{n+1}$ located on the right of the fine position sense line $S_n$, and the induced voltage $V(S_{n+2})$ of the remaining fine position sense line $S_{n+2}$.

Assume here that the polarity normalize coefficients $CPL(n)$, $CPR(n)$, and $CPB(n)$ are set in association with the number n as shown in Table 2.

TABLE 2

| n | 1 | 2 | 3 | 4 |
|---|---|---|---|---|
| CPL(n) | $-1$ | 1 | 1 | 1 |
| CPR(n) | 1 | 1 | 1 | $-1$ |
| CPB(n) | $-1$ | 1 | 1 | 1 |

The polarity (positive/negative) of each of the induced voltages $V_T$, $V_L$, $V_R$, and $V_B$ each having the normalized polarity becomes to be same as the corresponding polarity in any small region of the region where the cursor exists, th small region being detected by use of the sense line number n and the polarity judge signal $P(S_n)$ of the sense line $S_n$.

The values listed in Table 2 are set such that the polarity of each of the induced voltages $V_T$, $V_L$, $V_R$, and $V_B$ each having the normalized polarity is equal to the polarity of the induced viltage of the associated fine position sense line in the small region $A_3$ among the small regions $A_1$–$A_8$ (FIG. 5B).

Figures 17A, 17B, 17C:
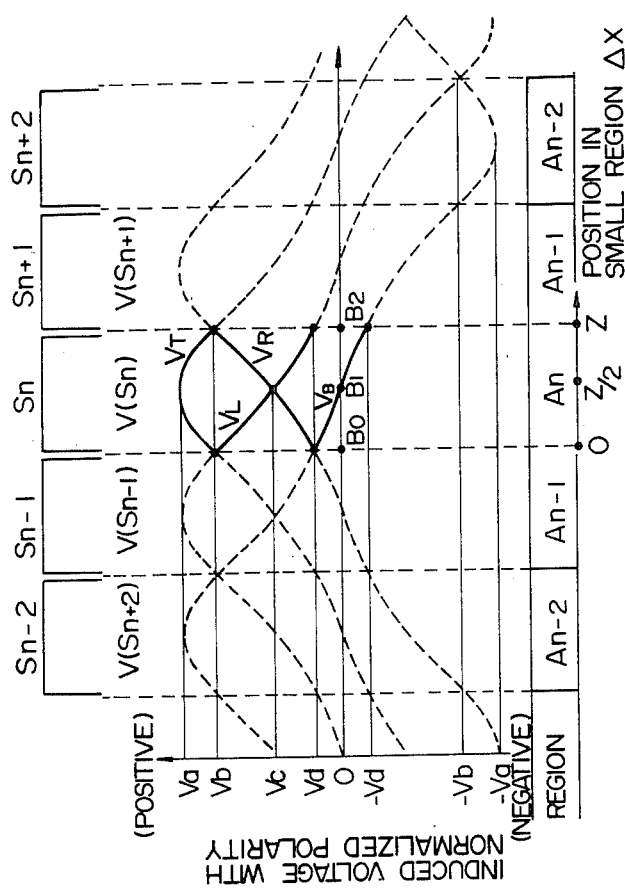

FIG. 17A shows the col or saddle sections of the loop portions of the fine position sense lines $S_n$, $S_{n-1}$, $S_{n+1}$, and $S_{n+2}$, whereas FIG. 17B illustrates the induced voltages $V_T$, $V_L$, $V_R$, and $V_B$ each with the normalized polarity in the small regions $A_n$ (ranging from point $B_0$ to point $B_2$ of the diagram) in the solid-line portion.

The precise position of the cursor 4 in the small region (to be referred to as a position in small region $\Delta x$) can be detected according to the relative magnitudes of the induced voltages $V_T$, $V_L$, $V_R$, and $V_B$ each having the normalized polarity.

The characteristics of the induced voltages shown in FIGS. 5A–5F and 17A–17C are related to a case where the cursor 4 is vertically (without any inclination) located on the coordinate read device 50, namely, the induced voltage characteristics associated with the fine position sense lines in a case where the cursor 4 has an inclination with respect to the coordinate read device 50 are different from those of FIGS. 5A–5F and 17A–17C.

When the cursor 4 is located on the coordinate read device 50 with an inclination with respect thereto, the AC magnetic field generated by the cursor 4 is inclined and hence there appears a change in the vertical component of the magnetic flux which intersects the loop portion $S_B$, $S_D$, or $S_F$ of FIG. 4D.

FIGS. 18A–18E illustrate the changes in the induced voltages $V_T$, $V_L$, $V_R$, and $V_B$ each having the normalized polarity when the cursor 4 are located with an inclination.

FIGS. 18A–18E show the characteristics of the induced voltages with the normalized polarity in the small region when the cursor 4 is located with an inclination of 0° (no inclination), 10°, 45°, $-10$°, and $-45$°, respectively.

Figure 18A:
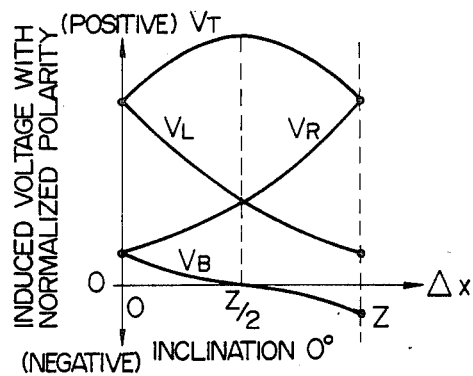

When the inclination of the cursor 4 is positive (FIGS. 18B–18C), as the inclination increases, the voltages $V_L$ and $V_R$ are increased and decreased, respectively, so that the complementary characteristic thereof is shifted and the polarity reverse position of the voltage V gradually moves from the central position to the right end (in the diagram). When the inclination of the cursor 4 is 45° as shown in FIG. 18C, the voltage $V_B$ takes a positive value in any cases, whereas the characteristic of the voltage $V_R$ is reversed in the small region.

On the contrary, when the inclination of the cursor 4 is negative (FIG. 18E), as the inclination becomes greater, the voltages $V_L$ and $V_R$ decreases and increases, respectively, so that the polarity reverse position of the voltage $V_B$ gradually moves from the central position Z/2 of the small region toward the left end ($\Delta x=0$) of the diagram. When the inclination of the cursor 4 is $-45$° as shown in FIG. 18F, the voltage $V_B$ takes a negative value in any case, whereas the voltage $V_L$ undergoes the polarity reverse in the small region.

Furthermore, the magnitude (absolute value) of the voltage $V_B$ tends to increase as the inclination becomes greater.

As shown in FIGS. 18A–18E, when the induced voltages $v(1)$–$v(4)$ and hence the induced voltages $V_T$, $V_L$, $V_R$, and $V_B$ with the normalized polarity are changed due to the inclination of the cursor 4, the relative magnitudes of the induced voltages $V_T$, $V_L$, $V_R$, and $V_B$ are also changed, which prevents the correct determination of the position $\Delta x$ of the cursor 4 in the small region $A_n$.

In order to reduce the possibility of the occurrence of the error in the position $\Delta x$ due to the inclination of the cursor 4, namely, to minimize the coordinate read error, the induced voltage correct circuit 199 corrects the induced voltages with the normalized polarity according to the direction and degree of the inclination of the cursor 4.

As shown in FIGS. 18A–18E, the induced voltage $V_B$ with the normalized polarity takes a larger value in proportion to the degree of the inclination of the cursor 4, where the value is positive and negative when the inclination of the cursor 4 is positive and negative, respectively. By use of this characteristic, the induced voltage correct circuit 199 detects the degree and direction of the inclination of the cursor 4 and effects the correction such that the induced voltages $V_T$, $V_U$, $V_R$, and $V_B$ with the normalized polarity respectively become to be in the proximity of the induced voltages $V_{To}$, $V_{Lo}$, $V_{Ro}$, and $V_{Bo}$ with the normalized polarity obtained when the inclination of the cursor 4 is 0°.

Next, a description will be given of a concrete operation of the induced voltage correct circuit 199.

Figure 19:
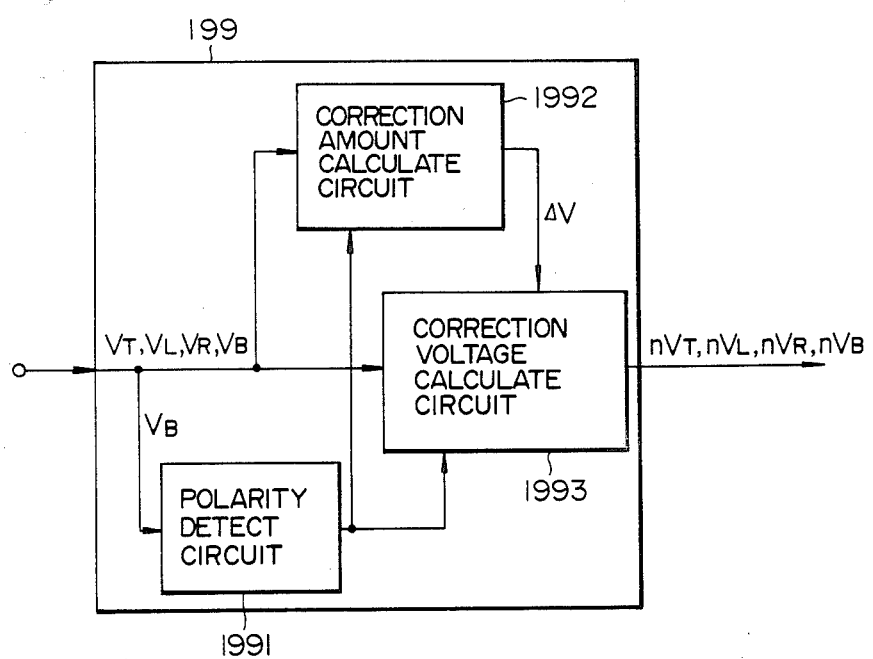
FIG. 19 is a schematic block diagram illustrating an induced voltage correct circuit.

As shown in FIG. 19, the induced voltage correct circuit 199 includes a polarity detect circuit 1991, a correction amount calculate circuit 1992, and a correction voltage calculate circuit 1993.

The polarity detect circuit 199 detects whether the induced voltage $V_B$ with the normalized polarity has a positive or negative value, and if the positive value results from the detection, the cursor 4 is judged to be inclined in the positive direction. If the negative value results, the cursor 4 is assumed to be inclined in the negative direction. The polarity detect circuit 199 controls the correction amount calculate circuit 1992 and the correction voltage calculate circuit 1993 to correct the induced voltages $V_L$, $V_R$, and $V_B$ depending on the direction of the inclination.

Figure 18B:
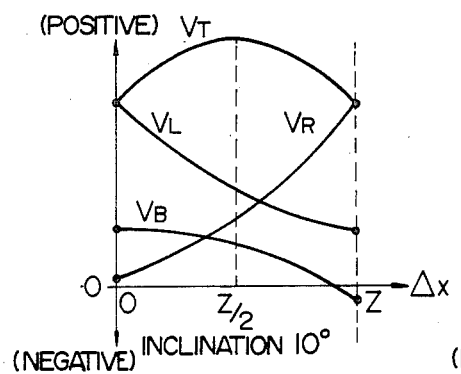
Figure 18D:
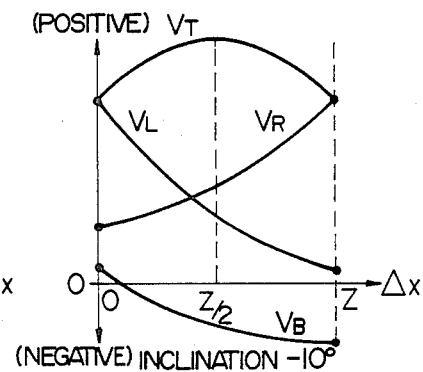
Figure 18C:
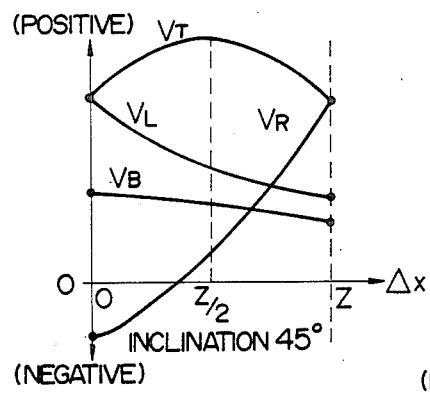
Figure 18E:
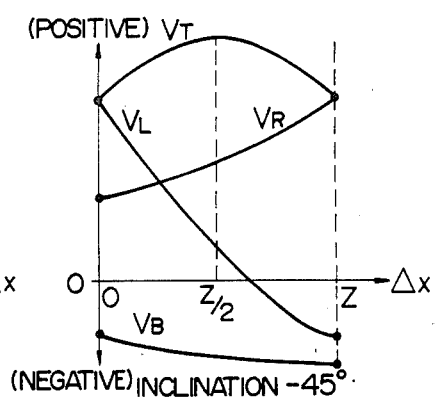

When the voltage $V_B$ is positive, namely, in the case of FIGS. 18B-18C, the correction amount calculate circuit 1992 calculates the correction amount $\Delta V$ according to the following formulae.

$$\Delta V = \begin{cases} \left(1 - \dfrac{V_R}{V_T}\right) \cdot |V_B|: & V_R \leqq 0 \\ |V_B|: & V_R > 0 \end{cases}$$

Since the correction amount $\Delta V$ is proportional to the magnitude of the voltage $V_B$ and at the same time is inversely proportional to the $V_R/V_T$, the correction amount $\Delta V$ is great when the position $\Delta x$ is in the neighborhood of zero and gradually decreases as the $\Delta x$ increases. When the $\Delta x$ is in the vicinity of Z, $\Delta x = Z$, the value of $\Delta V$ becomes to be zero.

Based on the correction amount $\Delta V$, the correction voltage calculate circuit 1993 corrects the induced voltages $V_L$ and $V_R$ with the normalized polarity as follows to output the correction voltages $nV_L$ and $nV_R$.

$$nV_R = V_R + \Delta V$$

$$nV_L = V_L - (V_B - \Delta V)$$

Since the correction amount $\Delta V$ is added to the induced voltage $V_R$ and the voltage $(|V_B| - \Delta V)$ is substrated from the voltage $V_L$ acoording to the formulae above, when the cursor 4 is inclined in the positive direction, the voltages $V_R$ and $V_L$ are decreased or increased depending on the inclination as shown in FIGS. 18B-18C, thereby effecting a compensation for each other.

Figure 20:
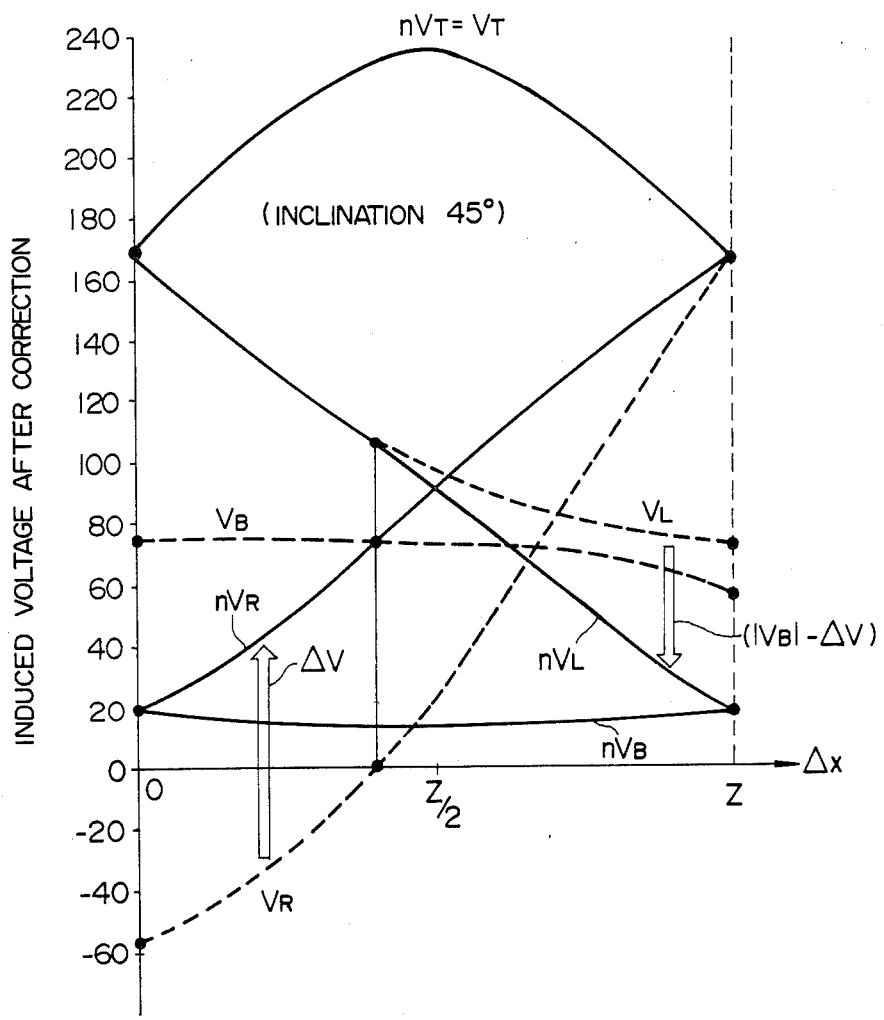
FIGS. 20–26 are graphs depicting characteristics of the induced voltage correct circuit.

FIG. 20 shows the correction characteristics developed for the inclination of 45°.

In this diagram, the induced voltages $V_T$, $V_L$, $V_R$, and $V_B$ with the normalized polarity are indicated with broken lines, whereas the induced voltages $nV_T$, $nV_L$, $nV_R$, and $nV_B$ after the correction are represented with solid lines.

As can be seen from this graph, the induced voltage $nV_L$, $nV_R$ undergone the correction have a complementary characteristic centered on the position in small range $\Delta x$ Z/2, namely, when the inclination of the cursor 4 is 0°, the correction is achieved to obtain substantially the same characteristic.

When the voltage $V_B$ is negative (i.e. in the case of FIGS. 18D and 18E), the correction amount calculate circuit 1992 executes calculations of the correction amount as follows.

$$\Delta V = \begin{cases} \left(1 - \dfrac{V_L}{V_T}\right) \cdot |V_B|: & V_L \leqq 0 \\ V_B: & V_L < 0 \end{cases}$$

Based on the correction amount $\Delta V$, the correction voltage calculate circuit 1993 corrects the induced voltages $V_L$ and $V_R$ with the normalized polarity to generate the correction voltages $nV_L$ and $nV_R$ as follows.

$$nV_L = V_L + V$$

$$nV_R = V_R - (|V_B| - \Delta V)$$

Figure 21:
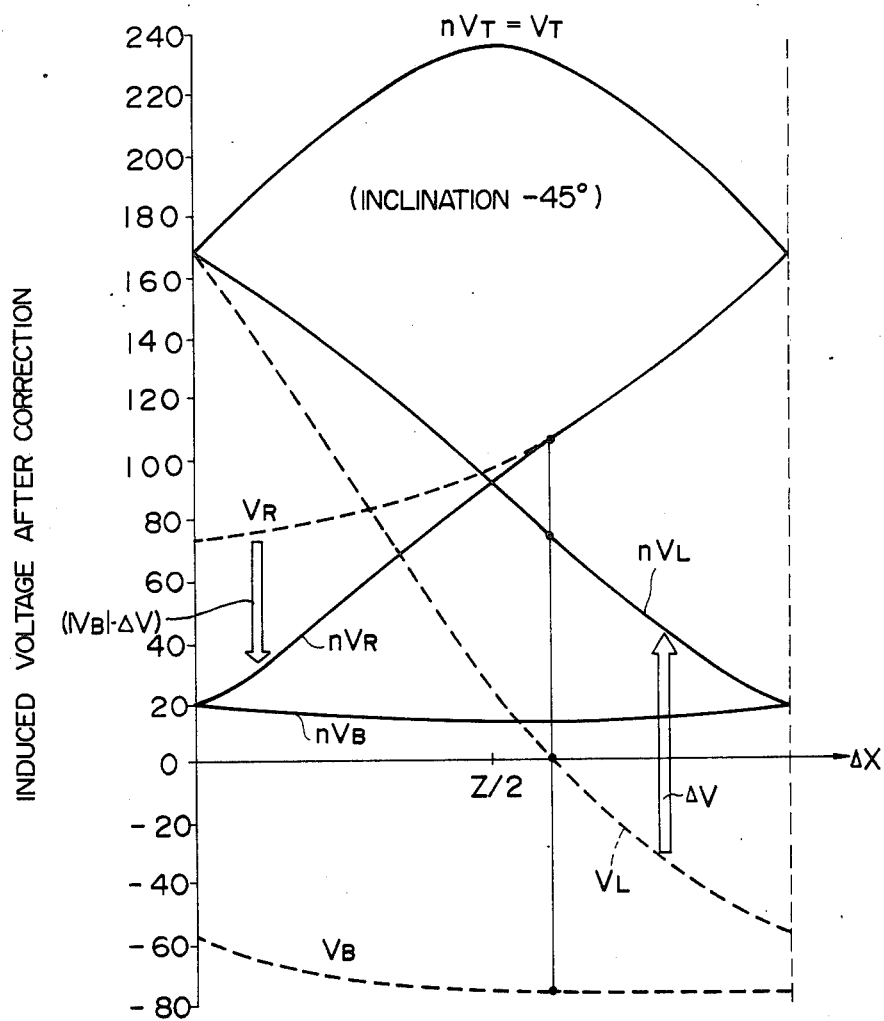

FIG. 21 shows the results of the correction for the inclination of 45°, representing the similar results to those of the corrected voltages $nV_L$ and $nV_R$ of FIG. 20.

The induced voltage correct circuit 199 effects the correction on the induced voltages $V_L$ and $V_B$ with the normalized polarity corresponding to the positive or negative value of the voltage $V_B$ as described above because even when the cursor 4 is not inclined, the induced voltage $V_B$ with the normalized polarity takes a positive value and a negative value for the value of $\Delta x$ being at most Z/2 and at least Z/2, respectively as shown in FIG. 18A.

Figure 22:
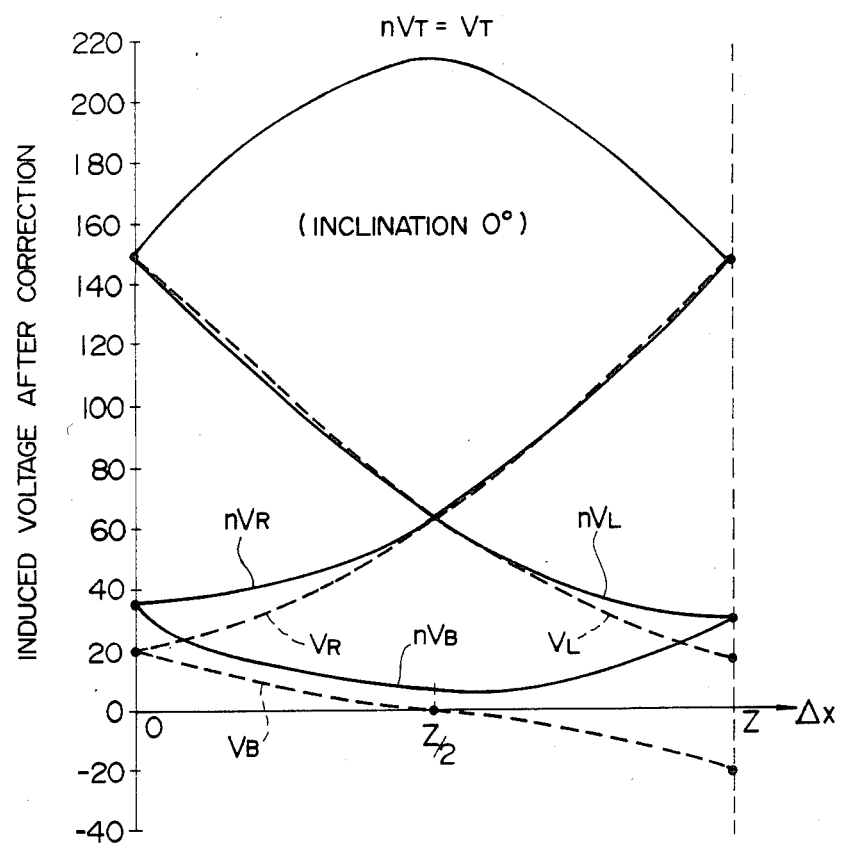

Since the voltage $V_B$ has a small magnitude and is symmetric in the horizontal direction centered on $\Delta = Z/2$, the correction amount $\Delta V$ becomes small and is horizontally symmetric centered on $\Delta x = Z/2$; consequently the relative magnitude of the correction voltages $nV_L$ and $nV_R$ is represented in a symmetric shape in the horizontal direction centered on $\Delta X = Z/2$. FIG. 22 shows the symmetric shapes of the induced voltages after the correction.

As described above, depending on whether the output signal, namely, the voltage $V_B$ from the polarity detect circuit 1991 has a positive value or a negative value, the correction voltage detect circuit 1993 achieves a correctinn on the voltage $V_L$ and $V_R$ by use of the correction amount $\Delta V$ attained from the correction amount calculate circuit 1992 and thereby outputs the correction voltages $nV_L$ and $nV_R$.

In addition, the correction voltage calculate circuit 1993 outputs the voltage $nV_T$ as $$nV_t = V_T$$

and, based on the resultant $nV_L$, $nV_R$, and $nV_T$, calculates the correction voltage $nV_B$ of the induced voltage $V_B$ according to the following formula.

$$nV_B = \frac{\max\{nV_L, nV_R\}}{nV_T} \cdot \min\{nV_L, nV_R\}$$

where, max $\{a, b\}$ indicates one of the greater value of a and b, and min $\{a, b\}$ denotes one of the smaller value of a and b. From the formula above, the correction value of the magnitude $|V_B|$ is calculated for the voltage resulted from the inclination of the cursor 4. FIGS. 20-22 also include the voltage $nV_B$ associated with the inclination of the cursor 4.

As shown in the diagrams above, the voltage $nV_B$ is equal to the value of $nV_R$ for the position $\Delta x = 0$ and gradually decreases as the $\Delta x$ increases so as to take the minimum value for $\Delta x = Z/2$; thereafter, the value of $nV_E$ increases again and takes a value identical to the value of $nV_L$ for $\Delta x = Z$.

Furthermore, the value of the voltage $nV_B$ may be calculated as follows to set the resultant value to zero for $\Delta x = Z/2$.

$$nV_B = \left[\frac{nV_L - nV_R}{nV_T - \min\{nV_L, nV_R\}}\right]^\alpha \cdot \min\{nV_L, nV_R\}$$

where, $\alpha$ is a constant to be experimentally determined.

Based on the corrected voltages $nV_T$, $nV_L$, $nV_R$, and $nV_B$ attained from the induced voltage correct circuit 199 described above, th precise position (the position in small region $\Delta x$) of the cursor 4 in a small region is detected by means of the two value generate circuit 192, the normalize circuit 193, and the position converte circuit 194.

The two signal generate circuit 192 calculates two composite voltages $V_S$ and $V_C$ according to the following formulae.

$$V_S = nV_T - nV_L + nV_R - nV_B$$

$$V_C = nV_T + nV_L - nV_R - nV_B$$

The function to calculate the position $\Delta x$ by use of the composite voltages $V_S$ and $V_C$ is identical to that described in conjunction with the first embodiment.

Incidentally, the normalize circuit 193 of the first embodiment calculates the normalized value $\rho$ from the following formula.

$$\rho = \frac{V_S}{\sqrt{V_S^2 + V_C^2}}$$

However, the normalized value $\rho$ need only have a monotonously increasing characteristic or a monotonously decreasing characteristic in the range of $\Delta x$ from zero to Z, namely, the normalized value $\rho$ is not restricted by the calculation of the formula above.

For example, the following normalized value $\rho$ may be used.

$$\rho = \begin{cases} \frac{V_S}{V_0} \cdot \frac{A}{2}: & V_S \geq V_C \\ A \cdot \left(1 - \frac{V_0}{V_S}\right): & V_S < V_C \end{cases}$$

where, A indicates a fixed constant value. The normalized value $\rho$ monotonously increases from zero to a value A in the range of $\Delta x$ from zero to Z.

Figure 23:
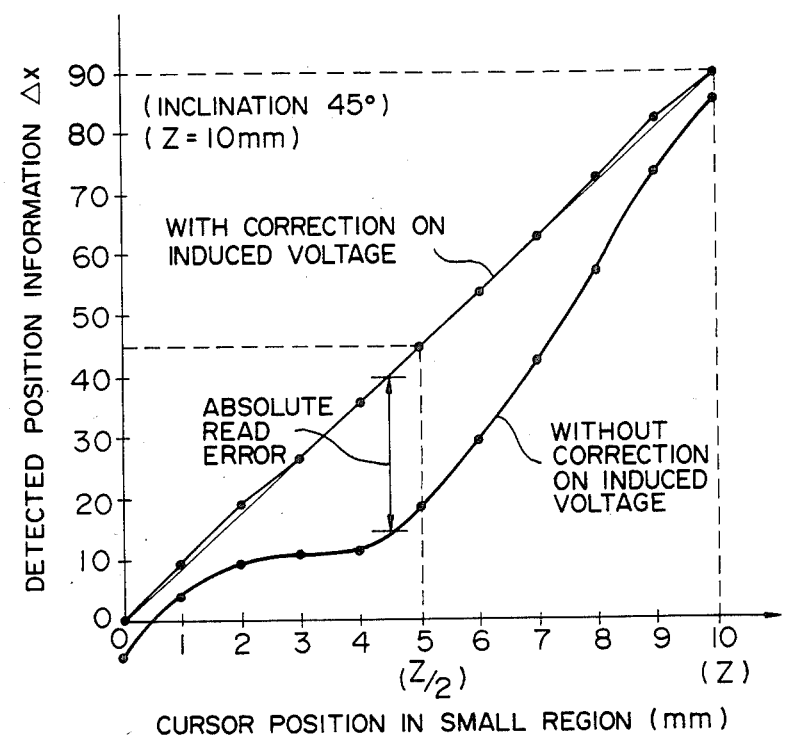
Figure 24:
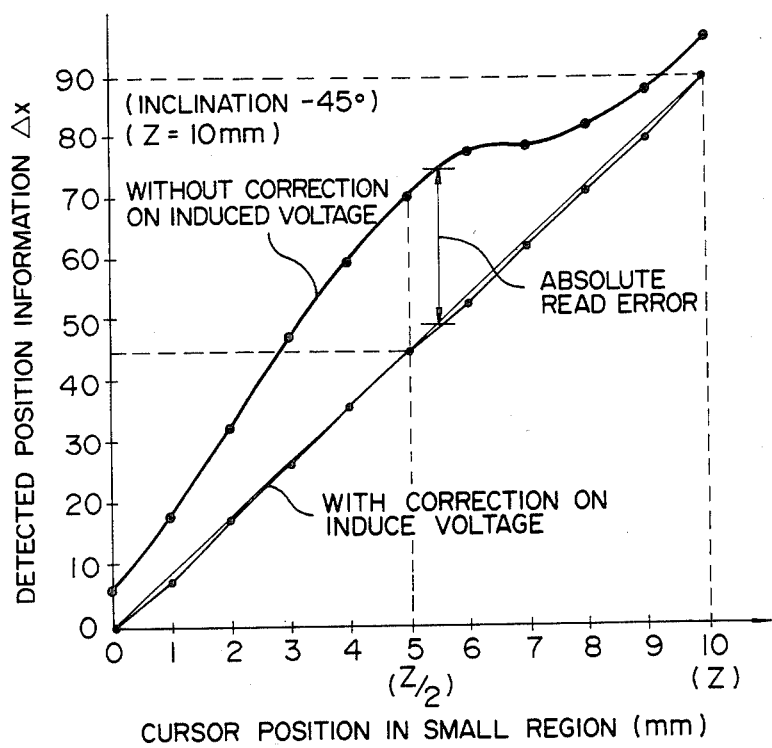
Figure 25:
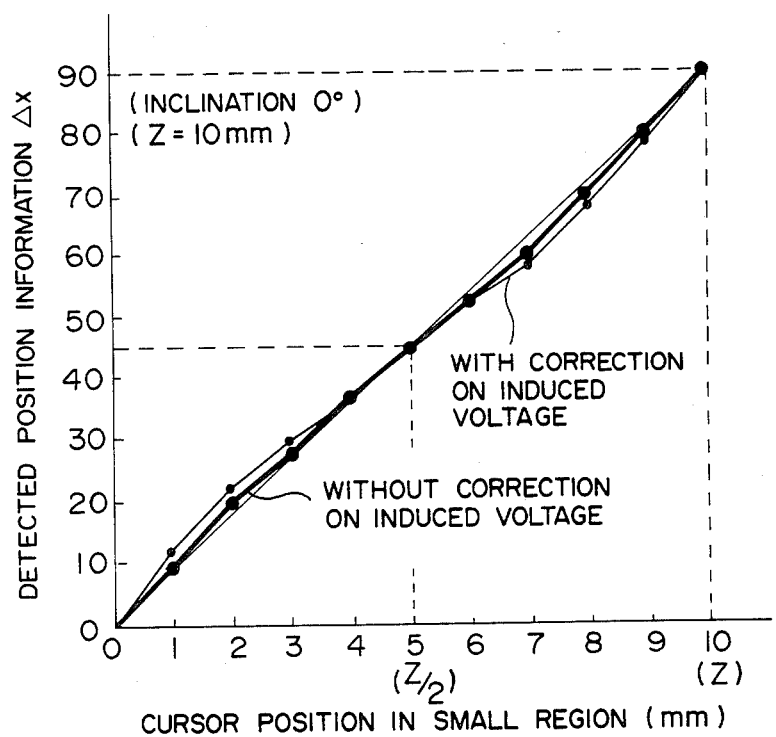

FIGS. 23-25 show the results of the actual measurements on the position of the cursor 4 in the small region detected according to the second embodiment.

The width Z (the shift width Z of the fine position sense line) is here selected to be 10 mm. In addition, the characteristics of FIGS. 23-25 are detected in association with the induced voltages with the normalized polarity and the correction voltages shown in FIGS. 20, 21, and 25, namely, the graph has been represented on assumption that the detected position information $\Delta x$ in small region takes a value in the range from zero to 90 for the actual position zero to 10 mm in the small range.

Moreover, in order to represent the effect of the induced voltage correct circuit 199, the graphs include the case where the induced voltage correct circuit 199 is used (marked as "with correction on induced voltage" in the diagrams) and the case where the induced voltage correct circuit 199 is not used (marked as "without correction on induced voltage" in the diagrams).

FIG. 23 is a graph representing the characterstics when the inclination of the cursor 4 is 45°. In principle, the position information $\Delta x$ must linearly change from zero to 90 with respect to the movement of the cursor 4 in the actual small range from the position 0 mm to the position 10 mm. In the case where the correction is not effected on the induced voltage, there has appeared an error of a maximum of $\Delta = 25$ (about 3 mm in terms of the position) in the small region. In contrast, when the correction is made on the induced voltages, the resultant values are substantially in the neighborhood of the ideal values, and the read error is about 0.2 mm.

FIG. 24 shows the characteristics when the inclination of the cursor 4 is $-45°$ in which although the direction of the read error is different, the magnitude thereof is similar to that of the characteristic of FIG. 24.

In FIG. 25, the characteristics developed when the inclination of the cursor 4 is 0° in which although the read error is slightly increased by the induced voltage correct circuit 199, the magnitude of the read error is quite small.

Figure 26:
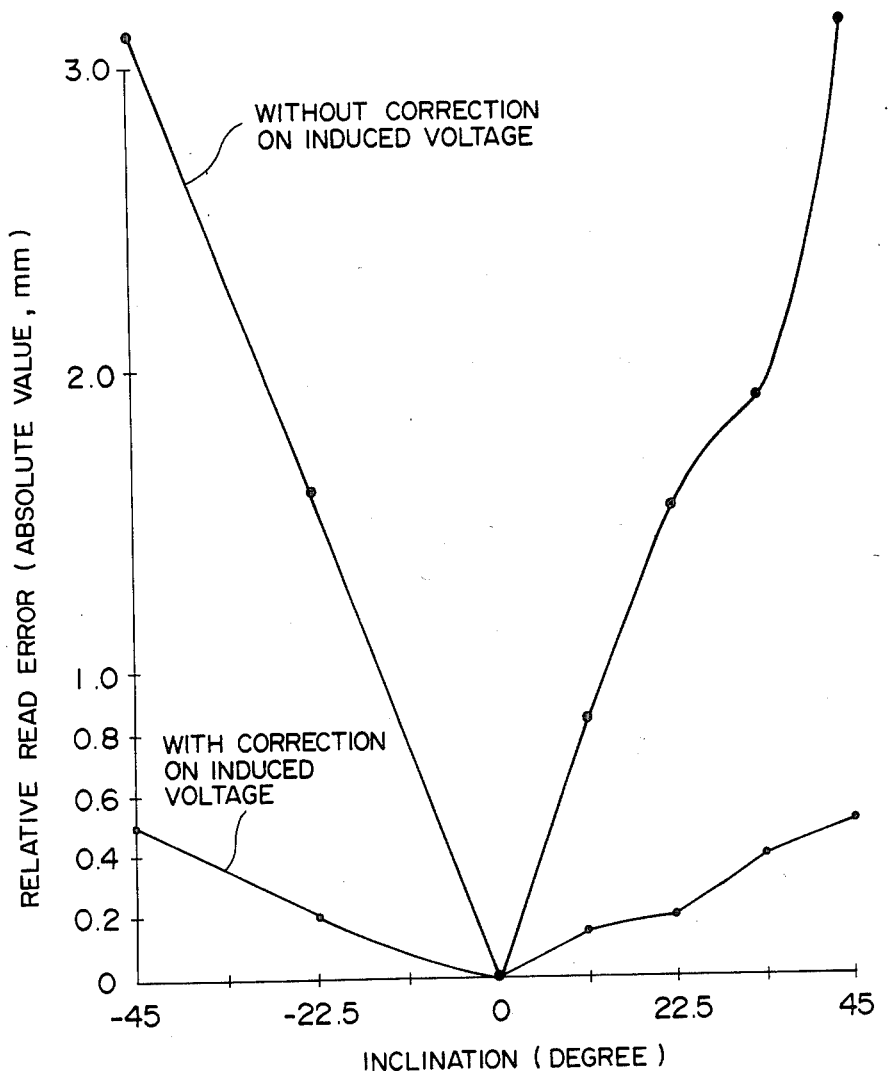

FIG. 26 is a graph illustrating the read error with respect to the inclination of the cursor 4 in the cases where the induced voltage correct circuit 199 is present and absent, respectively.

When the correct circuit 199 is not disposed, a read error of about 3 mm takes place as the inclination of the cursor 4 changes from 0° to ±45°; whereas with the induced voltage correct circuit 199, the read error is minimized to be about 0.5 mm, namely, the read error is reduced to be about 1/6 the error of the case where the correct circuit 199 is absent.

In the 2nd embodiment, the configuration and function of the coarse position detect circuit 20 is the same as those of the coarse position detect circuit 20 of the 1st embodiment.

Figure 27:
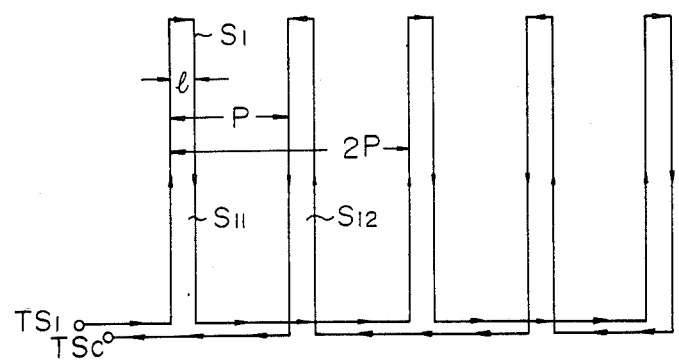
FIGS. 27-28 are pattern diagrams showing another example of the fine position sense lines.
Figure 28:
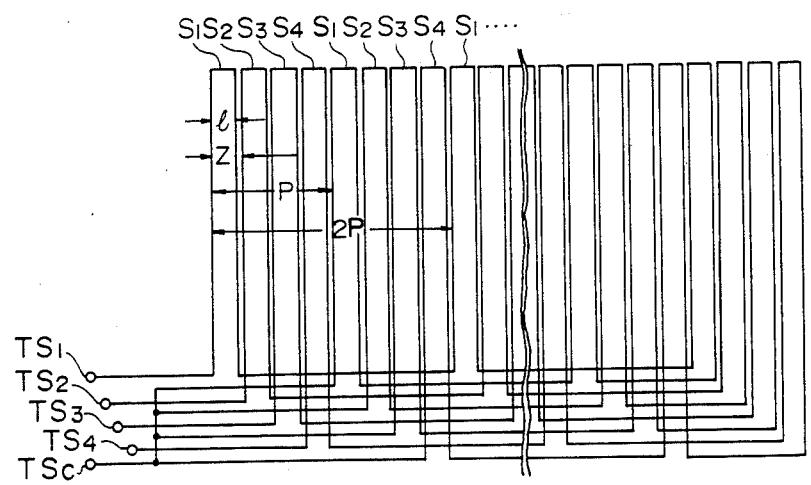

FIGS. 27-28 are diagrams schematically showing examples of the pattern for the fine position sense lines. In the same line $S_1$ of FIG. 27, the loop width of the loop portion is l and the pitch thereof is P. For the loop portions $S_{11}$-$S_{12}$ adjacent to each other, the currents are to flow in the opposite directions.

As shown in FIG. 28, the fine position sense lines $S_1$-$S_4$ are arranged at an interval of a width Z therebetween.

These fine position sense lines $S_1$-$S_4$ develop the induced voltage characteristics similar to those of the fine position sense lines of FIG. 3.

Figures 29A, 29B:
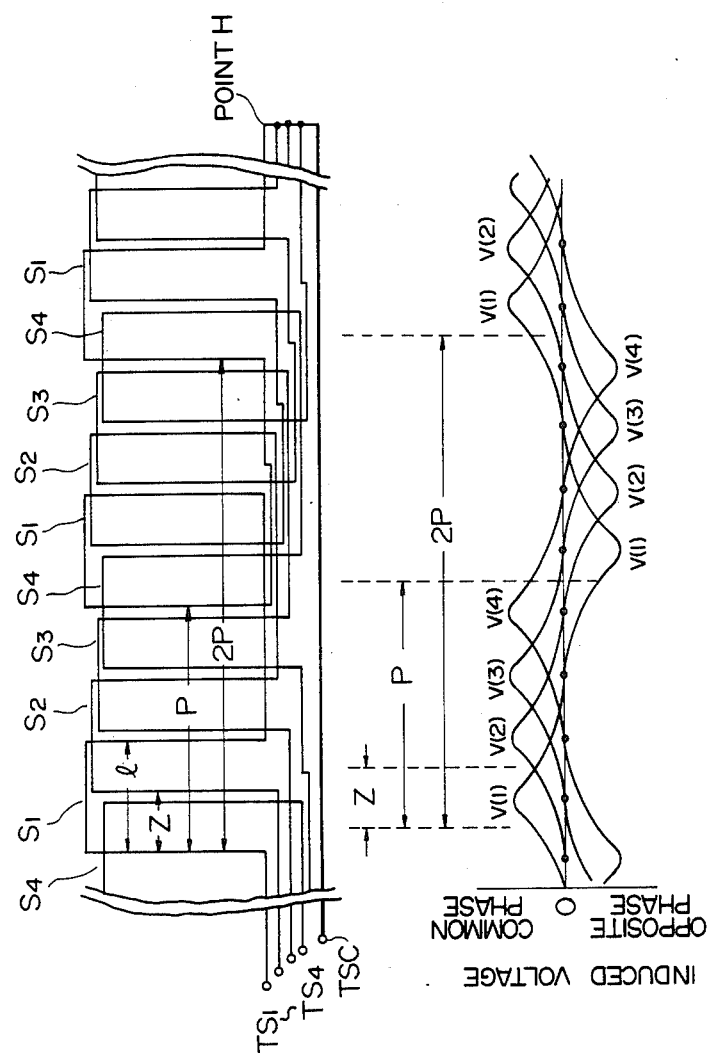
FIGS. 29A-29B are pattern diagrams showing still another example of the fine position detect circuit.

FIGS. 29A-29B are diagrams showing another example of the pattern of a group of fine position sense lines.

With respect to the loop width l and the width Z, the group of fine position sense lines of this example is different from that shown in FIG. 3.

In the sense lines of FIG. 3, $Z > l$ is assumed, whereas in the sense lines of FIGS. 29A-29B, $Z > l$ is assumed. The induced voltage characteristics of the fine position sense lines of FIGS. 29A-29B have also the repetitions feature as shown in FIG. 29B in which the induced voltage develops a repetitions characteristic having a period equal to two times the pitch P. This is similar to the induced voltage characteristics of the sense lines of FIG. 3.

Incidentally, there exists a relation among the pitch P, width Z, and number (n=4 in this case) of the fine position sense lines as follows.

$$Z = P/n$$

The loop width l and the shift width Z can be set according to the diameter of the excitation coil of the cursor 4 and the desired characteristics of the induced voltages.

Here, in the first and second embodiments, although four fine position sense lines are disposed, the number n of the sense lines is not limited to four, namely, the number n may be any value at least equal to two.

For example, if the group of fine position sense lines 51 is configured with two fine position sense lines each having a loop width l in a loop portion disposed with a pitch of P, the two sense lines being shifted by a shift width $Z=P/2$, the induced voltage characteristic develops a repetitious feature with a period of 2P, and the position of cursor 4 is detected according to the relative magnitude of the induced voltages and the results of the polarity judgement.

In addition, for example, if a group of fine position sense lines is configured in which n sense lines (n>2) are arranged with the width $Z=P/n$, the induced voltage characteristic repeats with a period 2P, and the position of the cursor 4 is detected by use of the maximum value of the induced voltages of the fine position sense lines, the relative magnitude associated with the induced voltages of the fine position sense lines adjacent to the sense line developing the maximum induced voltage, and the polarity of the induced line related to the maximum voltage.

The two signal generate circuit 192 and the normalize circuit constituting the fine position detect circuit 19 may be configured as follows.

Figure 30A:
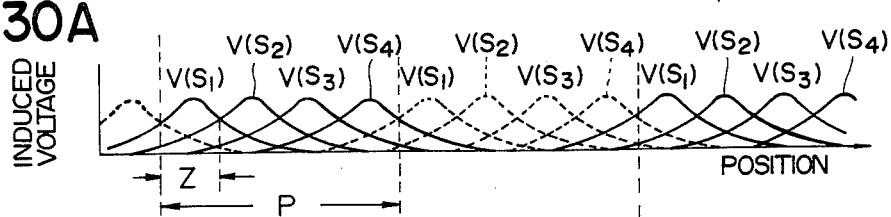
FIGS. 30A-30E are graphs illustrating waveforms associated with functions of other examples of a 2-signal generate circuit and a normalize circuit.

FIG. 30A shows the induced voltages $V(S_1)$–$V(S_4)$ appearing in the fine position sense lines $S_1$–$S_4$, respectively.

The two signal composite circuit 192 calculates two composite voltage values $V_S$ and $V_C$ as follows.

$$V_S = V(S_1) + V(S_2) - V(S_3) - V(S_4)$$

$$V_C = V(S_1) - V(S_2) - V(S_3) + V(S_4)$$

Figure 30B:
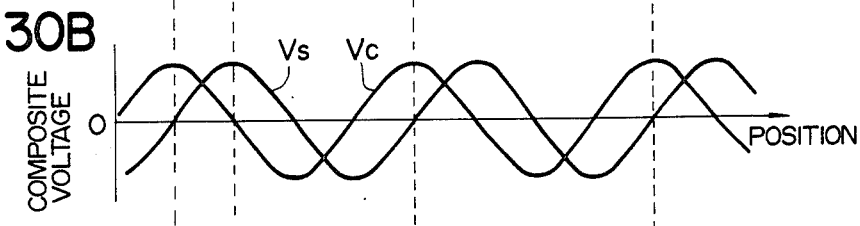
Figure 30C:
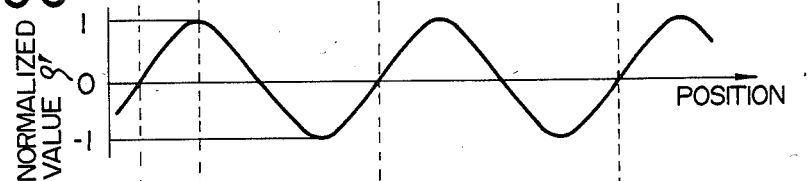

The composite voltage values $V_S$ and $V_C$ each develop repetitions characteristics with a pitch P as shown in FIG. 30B. In this case, the normalize circuit 193 first calculates the relative magnitude $\rho'$ of these composite voltage values $V_S$ and $V_C$ according to the expression (4) described above. The normalized value $\rho'$ is represented as a waveform of FIG. 30C. Moreover, the normalize circuit 193 calculates the normalized value $\rho$ as follows and supplies the value $\rho$ to the convert circuit 194.

$$\rho = \begin{cases} |\rho'| & \ldots V_S \text{ and } V_C \text{ have the same sign.} \\ 1 - |\rho'| & \ldots V_S \text{ and } V_C \text{ have the different signs.} \end{cases}$$

Figure 30D:
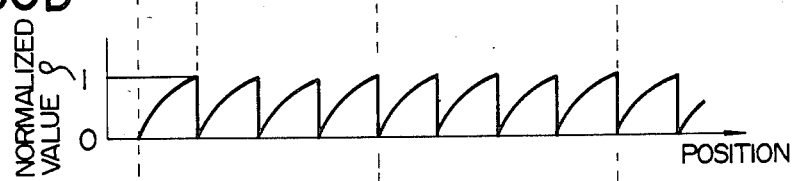
Figure 30E:
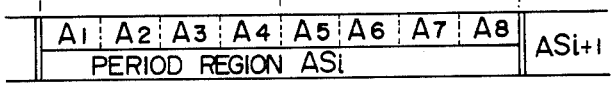

As shown in FIG. 30D, the normalized value $\rho$ develops a characteristic changing from zero to 1 in the small regions $A_1$–$A_8$ (FIG. 30E). Since this characteristic is identical to that of the output signal from the normalize circuit 193 of the first and second embodiments described above, the position signal $\Delta x$ is attained from the convert circuit 194.

Furthermore, the two signal generate circuit 192 need not necessarily calculate the two composite voltage values $V_S$ and $V_C$ based on the induced voltages appearing in all fine position sense lines as described in conjunction with the foregoing embodiments.

For example, the two composite voltage values $V_S$ and $V_C$ may be calculated as follows. Assume that the fine position sense line developing the maximum induced voltage $V_{max}$ is $S_{max}$, the induced voltage of the fine position sense line $S_R$ on the right side of the fine position sense line $S_{max}$ is $V_R$, and the induced voltage of the fine position sense line $S_L$ on the left side of the sense line $S_{max}$ is $S_L$. Then, the following expressions are established.

$$V_S = V_R - V_L$$

$$V_C = V_{max} - \min\{V_R, V_L\}$$

where, min $\{A, B\}$ indicates one of the smaller value of A and B. Based on these composite voltage values $V_S$ and $V_C$, the normalize circuit 193 calculates the normalized value $\rho$ as follows.

$$\rho = \frac{V_S}{V_C}$$

FIGS. 31A–31D show the characteristics of changes in the composite voltages $V_S$-$V_C$ and the normalized value $\rho$.

Figure 31A:
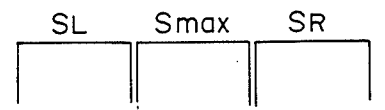
FIGS. 31A-31D are graphs depicting waveforms useful to explain functions of still another example of the 2-signal generate circuit.
Figure 31B:
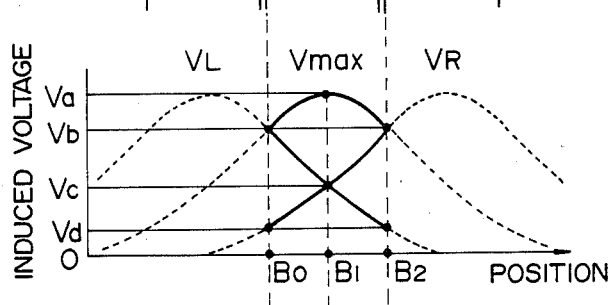
Figure 31C:
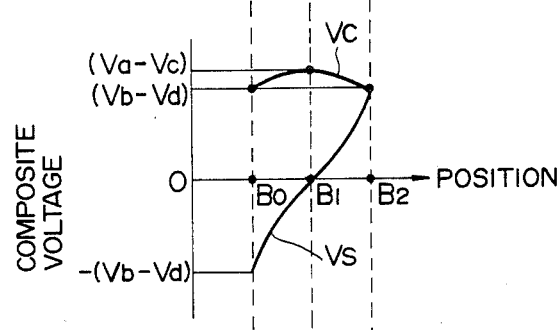
Figure 31D:
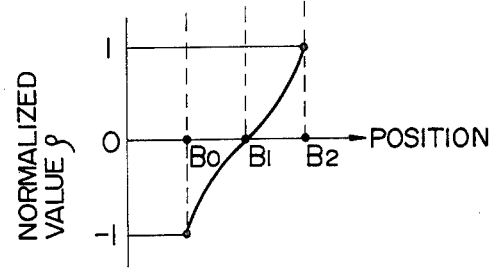

FIG. 31A is a schematic diagram illustrating the fine position sense lines $S_{max}$, $S_L$, and $S_R$; whereas FIG. 31B shows the induced voltages appearing in these fine position sense lines $S_{max}$, $S_L$, and $S_R$. The composite voltage value $V_S$ obtained from the induced voltages $V_{max}$, $V_L$, and $V_R$ developed at the points of $B_0$, $B_1$, and $B_2$ of FIG. 31B change from a voltage $-(V_b-V_d)$ to a voltage $(V_b-V_d)$ as the cursor 4 moves from the point $B_0$ to the point $B_2$ as shown in FIG. 31C. Furthermore, the voltage $V_C$ is always positive and takes a voltage value $(V_b-V_d)$ and a voltage value $(V_a-V_c)$ at the points $B_a$ and $B_1$, respectively. Thereafter, the voltage $V_C$ returns to the voltage $(V_b-V_d)$ again at the point $B_2$. Consequently, the normalized value $\rho(=V_S/V_C)$ is $(-1)$ at the point $B_0$, 0 at the point $B_1$, and $(+1)$ at the point $B_2$. The normalized value $\rho$ is memorized in the convert circuit 194. And then the position $\Delta x$ is obtained with the characteristic curve shown in FIG. 31D.

In the first and second embodiments of the present invention, for example, the absolute value generate circuit 15 and the polarity judge circuit 17 and the fine position detect circuit 19 and the coarse position detect circuit 20 constituting the coordinate detect circuit 18 are configured with digital circuits. These digital circuits and the control circuit 23 may be replaced with a microprocessor and programs controlling the operations of the microprocessor.

Figure 32:
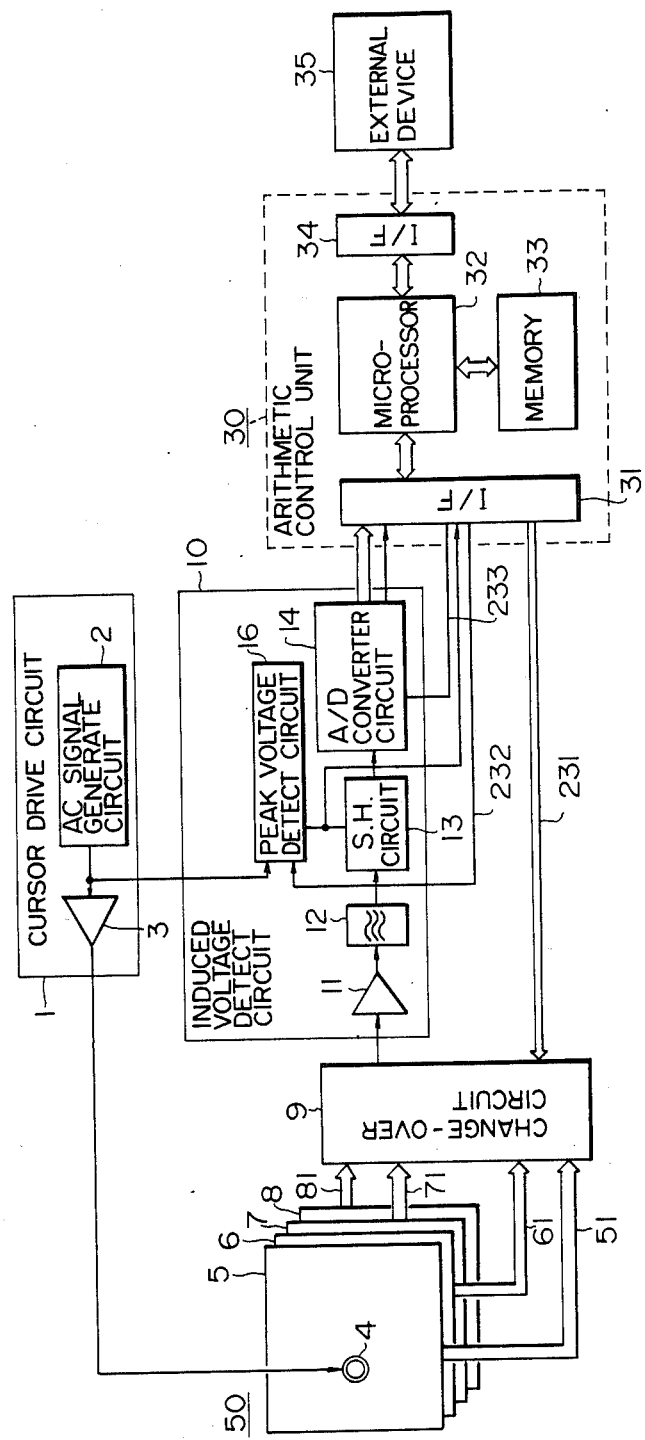
FIG. 32 is a schematic block diagram showing a third embodiment of the present invention.

FIG. 32 shows a configuration diagram illustrating the third embodiment of the present invention in which a microprocessor is used.

The same reference numbers are assigned to the components having the same functions as those of FIG. 1. An arithmetic control unit 30 comprises interface sections 31 and 34, a microprocessor 32, and a memory 33. The interface section 34 is connected to an external device 35. The induced voltage detect circuit 10 includes an amplifier 11, a filter 12, a sample and hold circuit 13, an A/D converter 14, and a peak voltage detect circuit 16.

The microprocessor 32 controls via the interface section 31 the change-over circuit 9 and the induced voltage detect circuit 10 at a predetermined timing, receives the induced voltages 51, 61, 71 and 81 from the grid structure 5–8, respectively, detects the coordinate value of the cursor 4, and supplies the detected coordinate value via the interface section 3 to the external device 35.

The function of the microprocessor 32 is controlled by the program stored in the memory 33. Since the function is the same as that of the digital circuits and the control circuit 23 and the details thereabout have already been described, description will be here given only briefly of the flowchart associated with the operations of the microprocessor 32.

Figure 33:
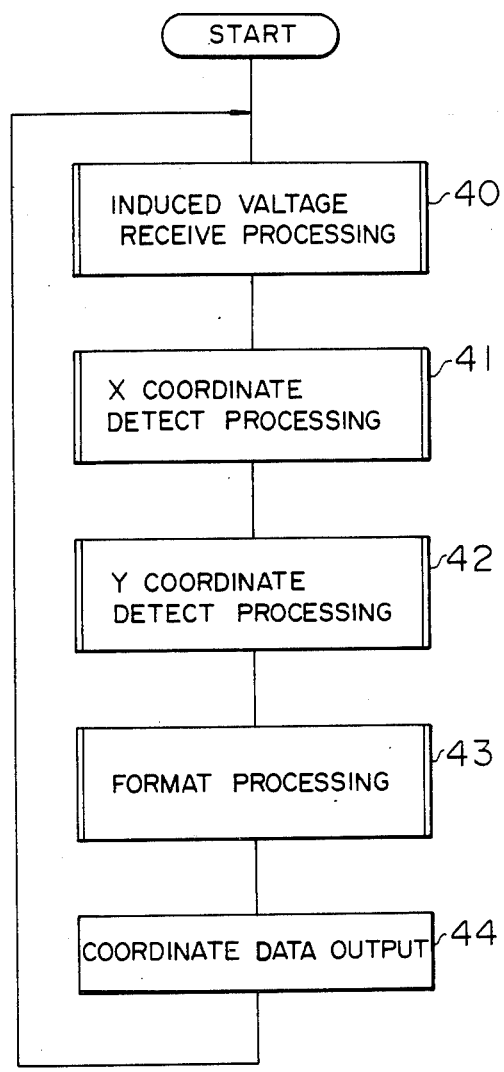
FIGS. 33-37 are flowcharts associated with the third embodiment of FIG. 32.

FIG. 33 is a general flow of the arthmetic control unit 30 of the present embodiment.

An induced voltage receive processing 40 comprises a routine to control the change-over circuit 9 and the induced voltage detect circuit 10 at a predetermined timing so as to receive the induced voltages 51, 61, 71, and 81 in the respective sense lines associated with the grid structures 5-8 for the x-axis and y-axis.

An x coordinate detect processing 41 includes a routine to detect an x coordinate value based on the induced voltages 51 and 71 from the grid structures 5 and 7 for the x axis obtained by the induced voltage receive processing 40, whereas a y coordinate detect processing 42 comprises a routine to detect a y coordinate in the simular fashion.

A format processing 43 converts the obtained x and y coordinate values according to a predetermined format, and the obtained coordinate data is outputted by the coordinate data output processing 44.

A series of processing above are repetitiously executed at a predetermined period (sampling period).

Figure 34:
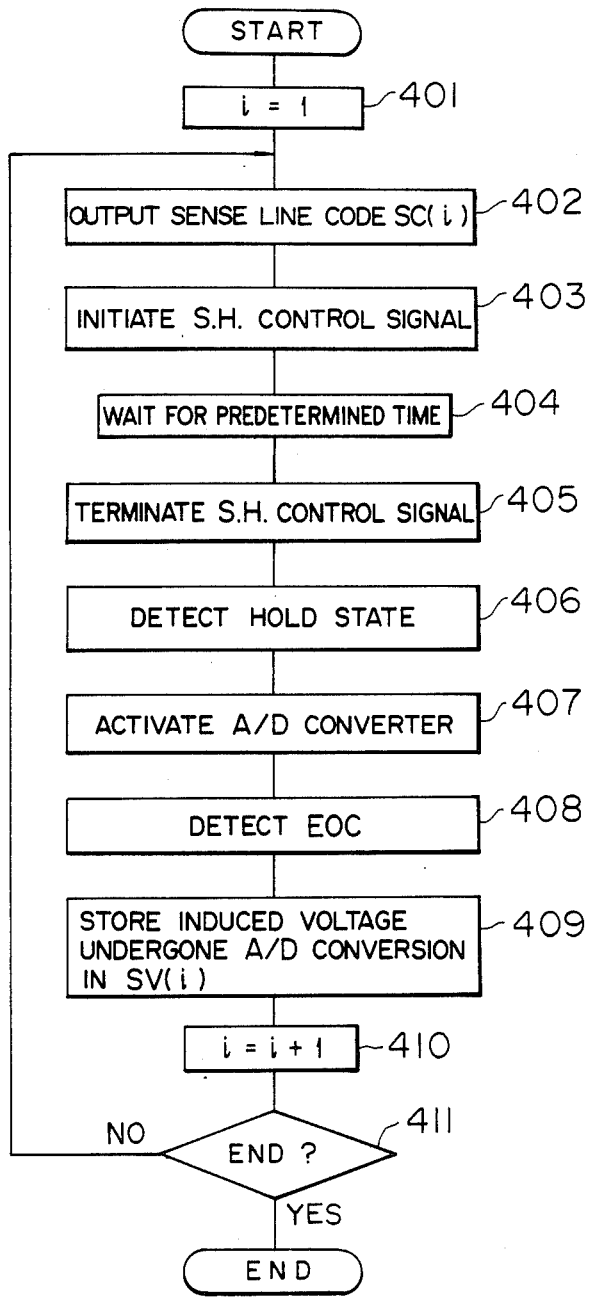

FIG. 34 shows a flowchart of the induced voltage receive processing 40. The operation timing of the induced voltage receive processing 40 corresponds to the timing of FIGS. 10A-10I. Consequently, the operation of this from will be described with reference to FIGS. 10A-10I. In the processing 402, a code SC(i) 231 of the sense line to be selected at time $t_1$ is supplied to the change-over circuit 9. Through the initiation and termination of the sample and hold control signll 232 in the processing steps 403-405, the sample and hold control signal 232 of FIG. 10D is delivered. In the processing 406, a check is effected to determine whether or not an output signal $S_F$ (shown in FIG. 10E) from the flip-flop 163 is in the hold state. If this is the case, the processing 407 activates the A/D converter 14 at time $t_4$. Thereafter, in the processing 408, a signal $E_{oc}$ indicating the completion of the A/D conversion is detected and the induced voltage value thus converted is stored in a predetermined area of the memory 33 in the processing 409. A set of the processing above is executed for each of the sense lines selected to the grid structures 5-8, respectively.

Figure 35:
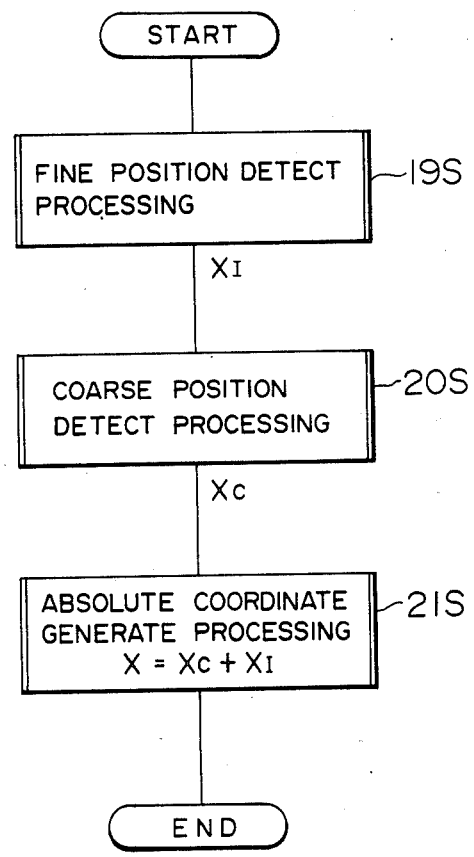

FIG. 35 shows the flowchart of the x coordinate detect processing 41. In this diagram, the processing having a function identical to the circuit of the embodiment of FIG. 1 is denoted by the same number with a letter "S" appended at the end thereof. This is also the case with the flowcharts of FIGS. 36-37.

According to the x coordinate detect processing 41, based on the induced voltages $V(S_1)-V(S_4)$ of the x-axis fine position sense lines after the A/D conversion, the fine position detect processing 19S calculates the position $X_I$ in the period and then the reference position $X_C$ is calculated by use of the induced voltages $V(G_i)$ of the x-axis coarse position sense lines and the position signal $X_I$; thereafter, the addition of $X=X_C+X_I$ is conducted in the absolute value generate processing 21S to attain the coordinate value X.

Figure 36:
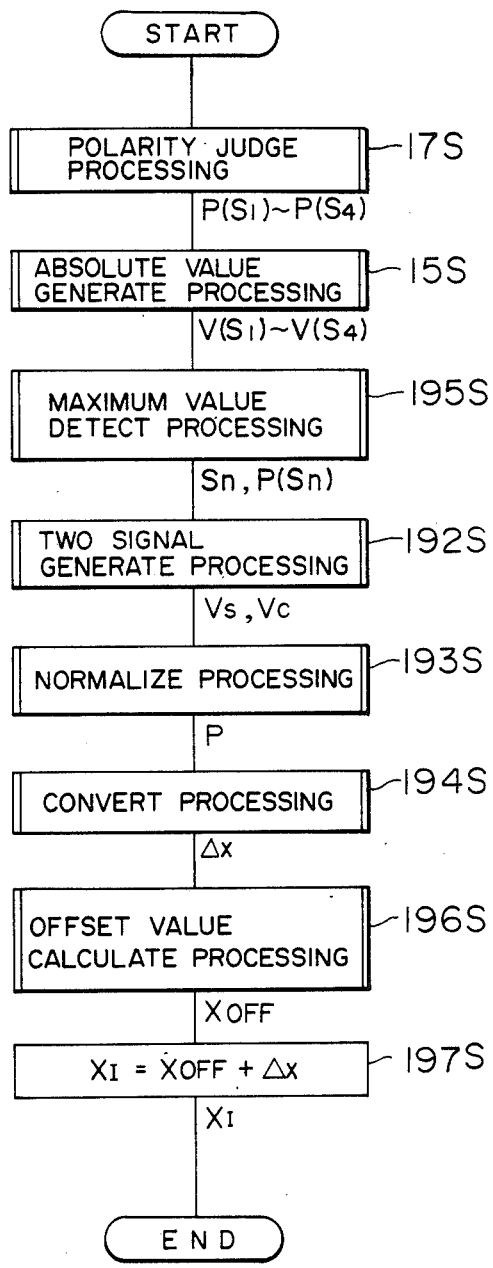

FIG. 36 shows the flowchart of the fine position detect processing 19S. In the processing 17S the phases of the respective induced voltages $V(S_1)-V(S_4)$ each are checked to determine whether or not the phases each are the same as the phase of the AC signal $S_G$, and the polarity signals $P(S_i)$ obtained as the results of the judge processing are stored in the predetermined areas of the memory 33. Depending on the value of the signal $P(S_i)$, the absolute value of the induced signal $V(S_i)$ is calculated in the processing 15S. The processing 195S then detects the fine position sense line $S_n$ developing the maximum induced voltage and then the sense line number n of the sense line $S_n$ and the polarity judge signal $P(S_n)$ associated with the number n are stored in a predetermined area of the memory 33.

In the processing 192S, based on the sense line number n and the induced voltages $V(1)-V(4)$, the composite voltage $V_S$ and $V_C$ are calculated, the normalized value $\rho$ is computed in the processing 193S, and the position signal $\Delta x$ is calculated in the processing 194S. In the processing 196S, the offset value $X_{OFF}$ is calculated from the number n and the polarity judge signal $P(S_m)$ obtained in the processing 195S, and then the offset signal $X_{OFF}$ and $\Delta x$ are added to each other to obtain the position signal $X_I$ in the processing 197S. The position signal $X_I$ thus attained is stored in a predetermined area of the memory 33.

Figure 37:
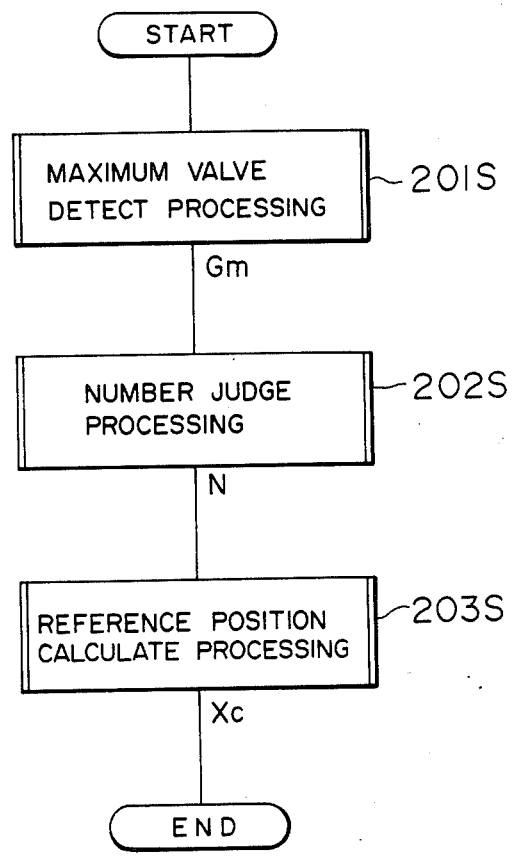

FIG. 37 shows the flowchart of the coarse position detect processing 20S. In the processing 201S, based on the induced voltages appearing in the respective coarse position sense lines, the coarse position sense line $G_m$ developing the maximum induced voltage is detected. The processing 202S detects the region $AS_i$ where the cursor 4 exists by use of the coarse position sense line number m and the position signal $X_I$ obtained by the fine position detect processing 19S in advance. In the processing 203S, based on the number N associated with the obtained region $AS_N$, the reference position $X_C$ of the region $AS_N$ is calculated.

In the third embodiment, since the digital circuit section is replaced with a configuration of the microprocessor 32 and the memory 33 storing the program to control the microprocessor 32, the size and weight of the apparatus can be minimized.

According to the present invention, the position of the cursor can be detected by use of a reduced number of fine position sense lines. The total number of the sense lines used to detect the coordinate according to the present invention is 1/5 that required for the apparatus described in the publication JP-B-57-31188 and ½ that necessary for the system described in the publication JP-B-53-34855. Moreover, in the apparatus of the present invention, the position of the cursor can be detected by means of, for example, four fine position sense lines and a plurality of coarse position sense lines. In addition, when detecting the coordinate position in a large range, although the number of the coarse position sense lines is increased, the number of the fine position sense line is kept unchanged. Furthermore, according to the position coordinate determining apparatus of the present invention, even if the cursor is located on the coordinate read device in an inclined state, the position of the cursor can be correctly determined.

While the present invention has been described with referenee to the particular illustrative embodiments, it is not restricted by those embodiments but only by the appended claims. It is to be appreciated that those skilled in the art can modify and change the embodiments without departing from the scope and spirit of the invention.

We claim:

1. A position coordinate determining apparatus for detecting coordinate positions of points on a plane comprising:
   (a) a cursor having therein a winding to pass an electric current;
   (b) cursor drive circuit means including an alternate current signal generate circuit means for generating an AC signal and for supplying the AC signal to the winding of the cursor;
   (c) coordinate read means having at least
   first grid structures for detecting a fine position of the cursor; and
   second grid structures for detecting a coarse position of the cursor, each said first grid structure having a first insulator substrate and a first position measuring conductor formed on, or in the insulator substrate, said first position measuring conductor detecting an induced magnetic field generated by an AC current flowing through the winding of the cursor and generating a first group of induced voltages, each said second grid structure having a second insulator substrate and a second position measuring conductor formed on, or in the second insulator substrate, said second position measuring conductor detecting a magnetic field generated by a current of an AC signal flowing through the winding of the cursor and for generating a second group of induced voltages;
   (d) change-over circuit means connected to said coordinate read means for receiving the first group of induced voltages and the second group of induced voltages from the coordinate read means and for effecting a change-over operation on a plurality of induced voltages included in the first and second groups of the induced signals, thereby generating a serial signal including as a time series said plurality of induced signals, or in a time-division fashion;
   (e) induced voltage detect circuit means connected to said cursor drive circuit means and said change-over circuit means for receiving the AC signal from said cursor drive circuit means, for receiving the serial signal from said change-over circuit means, for detecting at a timing of a peak voltage of the AC signal from the cursor drive circuit means a voltage value of each induced voltage included in the serial signal, and for holding the detected voltage values, thereby generating a plurality of the voltage values undergone the hold operation;
   (f) polarity judge circuit means, connected to said induced voltage detect circuit means for receiving a plurality of voltage values held by the induced voltage detect circuit means and for judging a polarity of each said voltage values, thereby generating a polarity judge signal;
   (g) coordinate detect circuit means connected to said polarity judge circuit means for receiving a plurality of voltage values held by the induced voltage detect circuit means and for receiving the polarity judge signal from said polarity judge circuit means including:
   fine position detect circuit means;
   coarse position detect circuit means; and
   an adder circuit connected to said fine position detect circuit means and said coarse position detect circuit means, said fine position detect circuit means effecting a computation on voltage values obtained from the first group of induced voltages of the first grid structures among said plurality of voltage values held by said induced voltage detect circuit means and generating a first position signal, thereby supplying the first position signal to said adder circuit, said coarse position detect circuit means effecting a computation on voltage values obtained from the second group of induced voltages of said second grid structures among said plurality of voltage values held by said induced voltage detect circuit means and generating a second position signal, thereby supplying the second position signal to said adder circuit, said adder circuit adding the first position signal to the second position signal, thereby generating a coordinate position signal.

2. A position coordinate determining apparatus according to claim 1 wherein said first position measuring conductor includes a plurality of fine position sense lines each said fine position sense line being arranged with a distance Z therebetween and having a plurality of parallel conductors with a width 1 therebetween, each group of said parallel conductors with a width 1 being arranged with a distance P therebetween and being electrically separated from each other, said parallel conductors adjacent to each other passing electric currents in directions opposing to each other.

3. A position coordinate determining apparatus according to claim 2 wherein said first position measuring conductor includes four fine position sense lines, the width 1 of the parallel conductors of each said fine position sense line is formed as $1 \div Z$.

4. A position coordinate determining apparatus according to claim 1 wherein said second position measuring conductors of said second grid structure include a plurality of coarse position sense lines each said coarse position sense line having a plurality of parallel conductors with a width 1 therebetween, each group of said parallel conductors with a width 1 being arranged with a disaance $Z_G$ therebetween.

5. A position coordinate determining apparatus according to claim 4 wherein the distance $Z_G$ of said coarse position sense lines is formed as $Z_G = 6 \times Z$.

6. A position coordinate determining apparatus according to claim 1 wherein said induced voltage detect circuit means includes:
   peak voltage detect circuit means for detecting a timing of a peak voltage of an AC signal supplied from said AC signal generate circuit means of said cursor drive circuit means; and
   sample and hold circuit means responsive to an output signal from said peak voltage detect circuit mean for sampling a voltage value of the serial signal supplied from said change-over circuit means and for holding the sampled voltage value.

7. A position coordinate determining apparatus according to claim 3 wherein said fine position detect circuit means of said coordinate detect circuit means includes two signal generate circuit means for converting into two composite signals $V_S$ and $V_C$ voltage values V(1), V(2), V(3), and V(4) of the induced voltages of said fine position sense lines, said voltage values being held by said induced voltage detect circuit means according to the following formulae:

$$V_S = V(1) + V(2) - V(3) - V(4)$$

$$V_C = V(1) - V(2) - V(3) + V(4).$$

8. A position coordinate determining apparatus according to claim 7 wherein said fine position detect circuit means includes normalize circuit means for effecting an operation on the two composite signals $V_S$ and $V_C$ according to th following formula, thereby generating a normalized value $\rho$:

$$\rho = \frac{V_S}{\sqrt{V_S^2 + V_C^2}}.$$

9. A position coordinate determining apparatus according to claim 1 wherein said coordinate detect circuit means comprises:
a microprocessor; and
a memory storing a program to control said microprocessor.

10. A position coordinate detecting apparatus for detecting coordinate positions of points on a plane comprising:
(a) a cursor having a winding to pass an electric current;
(b) cursor drive circuit means including an alternate current signal generate circuit means for generating an AC signal and for supplying the AC signal to the winding of the cursor;
(c) coordinate read means having at least
a pair of first grid structures disposed with a difference of 90° therebetween for detecting a fine position of the cursor; and
a pair of second grid structures disposed with a difference in arrangement therebetween for detecting a coarse position of the cursor, each said first grid structure having a first insulator substrate and a first position measuring conductor formed on, or in the insulator substrate, said first position measuring conductor detecting an induced magnetic field generated by an AC current flowing through the winding of the cursor and generating a first group of induced voltages, each said second structure having a second insulator substrate and a second position measuring conductor formed on, or in the second insulator substrate, said second position measuring conductor detecting a magnetic field generated by a current of an AC signal flowing through the winding of the curso and for generating a second group of induced voltages;
(d) change-over circuit means connected to said coordinate read means for receiving the first group of induced voltages and the second group of induced voltages from the coordinate read means and for effecting a change-over operation on a plurality of induced voltages included in the first and second groups of the induced voltages, thereby generating a serial signal including as a time series said plurality of induced signals, or in a time-division fashion;
(e) induced voltage detect circuit means connected to said cursor drive circuit means and said change-over circuit means for receiving the AC signal from said cursor drive circuit means, for receiving the serial signal from said change-over circuit means, for detecting at a timing of a peak voltage of the AC signal from the cursor drive circuit means a voltage value of each induced voltage included in the serial signal, and for holding the detected voltage values, thereby generating a plurality of the voltage values undergone the hold operation;
(f) polarity judge circuit means connected to said induced voltage detect circuit means for receiving a plurality of voltage values held by the induced voltage detect circuit means and for judging a polarity of each said voltage values, thereby generating a polarity judge signal;
(g) coordinate detect circuit means connected to said polarity judge circuit means for receiving a plurality of voltage values held by the induced voltage detect circuit means and for receiving the polarity judge signal from said polarity judge circuit means including:
fine position detect circuit means;
coarse position detect circuit means; and
an adder circuit connected to said fine position detect circuit means and the coarse position detect circuit means, said fine position detect circuit means effecting computation on voltage values obtained from the first group of induced voltages of the first grid structures among said plurality of voltage values held by said induced voltage detect circuit means and generating a first position signal, thereby supplying the first position signal to said adder circuit, said coarse position detect circuit means effecting a computation on voltage values from the second group of induced voltages of said second grid structures among said plurality of voltage values held by said induced voltage detect circuit means and generating a second position signal, thereby supplying the second position signal to said adder circuit, said adder circuit adding the first position signal to the second position signal, thereby generating a coordinate position signal.

11. A position coordinate determining apparatus according to claim 10 wherein said first position measuring conductor includes a plurality of fine position sense lines each said fine position sense line being arranged with a distance Z therebetween and having a plurality of parallel conductors with a width l therebetween, each group of said parallel conductors with a width l being arranged with a distance P therebetween and being electrically separated from each other, said parallel conductors adjacent to each other passing electric currents in directions opposing to each other.

12. A position coordinate determining apparatus according to claim 11 wherein said first position measuring conductor includes four fine position sense lines, the width l of the parallel conductors of each said fine position sense lines is formed as $l \div Z$.

13. A position coordinate determining apparatus according to claim 10 wherein said second position measuring conductors of said second grid structure include a plurality of coarse position sense lines, each said coarse position sense line having a plurality of parallel conductors with a width l therebetween, each group of said parallel conductors with a width l being arranged with a distance $Z_G$ ($Z_G < P$) therebetween.

14. A position coordinate determining apparatus according to claim 13 wherein the distance $Z_G$ of the said coarse position sense lines is formed as $Z_G = 6 \times Z$.

15. A position coordinate determining apparatus according to claim 10 wherein said induced voltage detect circuit means includes:
peak voltage detect circuit means for detecting a timing of a peak voltage of an AC signal supplied from said AC signal generate circuit means of said cursor drive circuit means; and sample and hold circuit means responsive to an output signal from said peak voltage detect circuit means for sampling a voltage value of the serial signal supplied from said change-over circuit means and for holding the sampled voltage value.

16. A position coordinate determining apparatus according to claim 12 wherein said fine position detect circuit means of said coordinate detect circuit means includes two signal generate circuit means for converting into two composite signals $V_S$ and $V_C$ voltage values $V(1)$, $V(2)$, $V(3)$, and $V(4)$ of the induced voltages of said fine position sense lines ($S_i$), said voltage values being held by said induced voltage detect circuit means according to the following formulae:

$$V_S = V(1) + V(2) - V(3) - V(4)$$

$$V_C = V(1) - V(2) - V(3) + V(4).$$

17. A position coordinate determining apparatus according to claim 16 wherein said fine position detect circuit means includes normalize circuit means for effecting an operation on the two composite signals $V_S$ and $V_C$ according to the following formula, thereby generating a normalized value $\rho$:

$$\rho = \frac{V_S}{\sqrt{V_S^2 + V_C^2}}.$$

18. A position coordinate determining apparatus according to claim 10 wherein said coordinate detect circuit means comprises:
a microcomputer; and
a memory storing a program to control said microprocessor.

19. A coordinate read device for use with a position coordinate determining apparatus detecting coordinate positions of points on a plane comprising:
(a) first grid structures including a first insulator substrate and a first position measuring conductor formed on, or in said first insulator substrate, said first position measuring conductor having a plurality of fine position sense lines each said fine position sense line being disposed with a distance Z therebetween and including a plurality of groups of parallel conductors each having a width l, each said group of parallel conductors being disposed electrically separated from each other with a distance P therebetween, said groups of parallel conductors adjacent to each other passing electric currents in directions opposing to each other; and
(b) second grid structures including a second insulator substrate and a second position measuring conductor formed on, or in said second insulator substrate, said second position measuring conductor having a plurality of coarse position sense lines each said coarse position sense line being disposed with a distance $Z_G$ ( $Z < Z_G < P$) therebetween.

20. A coordinate read device according to claim 19 wherein the distance P of said parallel conductors is selected to be eight times the distance Z of said fine position sense lines ($P = 8 \times Z$) and the distance $Z_G$ of said coarse position sense lines is selected to be six times the distance Z ($Z = 6 \times Z$).

* * * * *